US012283809B2

(12) United States Patent
Yang

(10) Patent No.: US 12,283,809 B2
(45) Date of Patent: Apr. 22, 2025

(54) CUTOFF DEVICE FOR HIGH-DC-VOLTAGE ELECTRIC CURRENT WITH PLASMA TUBE

(71) Applicant: SUPERGRID INSTITUTE, Villeurbanne (FR)

(72) Inventor: Yang Yang, Villeurbanne (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 25 days.

(21) Appl. No.: 18/552,842

(22) PCT Filed: Mar. 31, 2022

(86) PCT No.: PCT/FR2022/050608
§ 371 (c)(1),
(2) Date: Sep. 27, 2023

(87) PCT Pub. No.: WO2022/208029
PCT Pub. Date: Oct. 6, 2022

(65) Prior Publication Data
US 2024/0170951 A1    May 23, 2024

(30) Foreign Application Priority Data
Mar. 31, 2021    (FR) ...................... 2103336

(51) Int. Cl.
*H02H 7/26*    (2006.01)
*H01H 9/54*    (2006.01)
(Continued)

(52) U.S. Cl.
CPC ............... *H02H 7/268* (2013.01); *H01H 9/54* (2013.01); *H02H 3/08* (2013.01); *H02H 3/087* (2013.01); *H02H 3/202* (2013.01)

(58) Field of Classification Search
CPC .......... H02H 7/268; H02H 3/08; H02H 3/087; H02H 3/202; H01H 33/596
(Continued)

(56) References Cited

U.S. PATENT DOCUMENTS 3,758,790 A    9/1973  Kind et al.
4,442,469 A    4/1984  Yanabu et al.
(Continued)

FOREIGN PATENT DOCUMENTS

EP    2502248 A1    9/2012
EP    3091626 A1    11/2016
(Continued)

OTHER PUBLICATIONS

International Search Report from corresponding PCT Application No. PCT/FR2022/050608, Jun. 9, 2022.
(Continued)

*Primary Examiner* — Yemane Mehari
(74) *Attorney, Agent, or Firm* — Workman Nydegger

(57) ABSTRACT

A DC high voltage cut-off device includes at least one cut-off module, having: a main cut-off apparatus in a main branch, a general surge protector in an absorption branch, and a changeover branch, with at least one changeover capacitor wherein: a first plasma tube switch in the changeover branch, a pre-charge circuit of the changeover capacitor, a changeover surge protector, in parallel with the changeover capacitor, and having a protection voltage lower than a nominal operating voltage of the cut-off module and, by at least one pilotable switch which supplies the first plasma tube switch with a voltage derived from an electric voltage between the armatures of the changeover capacitor.

20 Claims, 7 Drawing Sheets

(51) Int. Cl.
  *H02H 3/08* (2006.01)
  *H02H 3/087* (2006.01)
  *H02H 3/20* (2006.01)

(58) Field of Classification Search
  USPC .......................................................... 361/111
  See application file for complete search history.

(56) References Cited

U.S. PATENT DOCUMENTS

| | | | |
|---|---|---|---|
| 4,805,062 A | 2/1989 | Shirouzu et al. | |
| 5,379,014 A | 1/1995 | Sato et al. | |
| 5,825,176 A | 10/1998 | Goebel | |
| 10,256,067 B1 | 4/2019 | Sommerer et al. | |
| 10,547,241 B1* | 1/2020 | Li | H02M 3/1588 |
| 2010/0097733 A1* | 4/2010 | E | H02H 1/0015 |
| | | | 361/42 |
| 2014/0299579 A1* | 10/2014 | Hartmann | H01H 33/596 |
| | | | 361/93.1 |
| 2017/0178844 A1* | 6/2017 | Ängquist | H02H 3/08 |
| 2019/0295801 A1 | 9/2019 | Sommerer et al. | |
| 2019/0348913 A1* | 11/2019 | Zhang | H02M 3/07 |
| 2020/0244155 A1* | 7/2020 | Zambetti | H02M 3/158 |
| 2022/0181973 A1* | 6/2022 | Huang | H02M 3/07 |

FOREIGN PATENT DOCUMENTS

| | | | | |
|---|---|---|---|---|
| EP | 3522194 A1 | | 8/2019 | |
| EP | 3522196 A1 | * | 8/2019 | ........... H01H 33/596 |
| WO | 2015166600 A1 | | 11/2015 | |
| WO | 2015185096 A1 | | 12/2015 | |

OTHER PUBLICATIONS

French Search Report from corresponding FR Application No. 2103336, Dec. 23, 2021.

* cited by examiner

CUTOFF DEVICE FOR HIGH-DC-VOLTAGE ELECTRIC CURRENT WITH PLASMA TUBE

TECHNICAL FIELD

The invention relates to a cut-off device for electric current under high DC voltage (HVDC). Such devices are intended to be implemented in HVDC networks or network units in the event of the appearance of an electrical fault generating a fault current in at least one electrical conductor of the network.

HVDC networks are in particular envisaged as a solution for the interconnection of disparate or non-synchronous electricity production sites. HVDC networks are in particularly envisaged for the transmission and distribution of energy produced by offshore wind farms rather than AC current technologies, due to lower line losses and to the absence of impact of the parasitic capacitances of the network on long distances. Such networks typically have nominal operating voltage levels greater than 75 kV, in particular of the order of 100 kV and more.

In the present text, a high DC voltage device is considered to be either a "high voltage A" device, in which the DC nominal operating voltage is greater than 1,500V, but less than or equal to 75,000 V (75 kV), or a "high voltage B" (or very high voltage) device when the DC nominal operating voltage is greater than 75,000 V (75 kV). Thus, the high DC voltage field includes the "high voltage A" field and the "high voltage B" field.

The current cut-off in such networks is a crucial issue directly conditioning the feasibility and development of such networks.

The evolution of these networks today tends towards the interconnection of infrastructures to lead to mesh networks, that is to say networks including several possible paths between two given points of the network. In these networks, there are electrical installations, including in particular electrical stations or electrical sub-stations, in which there is at least one electrical circuit cut-off apparatus within an electrical circuit.

In an electrical circuit, there is generally at least one voltage source, and at least one voltage user, which can comprise any apparatus or set of apparatuses or any network having such apparatuses that use the electrical energy to transform it into another form of energy, for example into mechanical, and/or calorific, and/or electromagnetic energy, etc.

In an electrical circuit, there is generally at least one electrical cut-off apparatus making it possible to interrupt the flow of the electric current in the circuit, generally between the voltage source and the voltage user, or between the voltage source and the ground.

Different types of electrical cut-off device intended to be interposed in an electrical conductor of an electrical circuit are known. For example, circuit breakers are known, which are mechanical apparatuses for cutting off the electrical circuit and which are designed and dimensioned to authorize in particular opening under charge or under fault conditions of the electrical circuit in which they are interposed. There are also known electrical cut-off apparatuses, of simpler design, such as disconnectors which are generally not designed to carry out cut-offs of circuits under charge, but rather to ensure, in a circuit where the flow of current is already interrupted by another cut-off apparatus, the safety of property and people during interventions, by ensuring electrical insulation of a predetermined high level between an upstream portion of a conductor of the circuit, linked for example to the voltage source, and a downstream portion of this circuit conductor.

In a main cut-off device of the mechanical type, the current cut-off is obtained only by the opening of a mechanical switch element. Such a mechanical switch element includes two conductive parts making contact which are in mechanical and electrical contact when the switch element is closed and which separate mechanically when the switch element is open. This mechanical separation is generally performed by movement of a movable conductive part relative to a fixed conductive part. These mechanical electrical cut-off apparatuses have several drawbacks when they are traversed by high currents, in particular under high DC voltage.

In the presence of a DC current and/or high voltage, the mechanical separation can result in the establishment of an electric arc between the two conductive parts, due to the high energies accumulated in the network that the apparatus protects. As long as the electric arc remains established through the mechanical separation, the mechanical electrical cut-off apparatus does not perform the electrical cut-off since a current continues to flow through the apparatus by the presence of the arc. The electric cut-off, in the sense of the actual interruption of the flow of the electric current, is sometimes particularly difficult to achieve in a context of high DC currents, these conditions tending to maintain the electric arc. Moreover, this electric arc degrades, on the one hand, by erosion, the two conductive parts making contact, and on the other hand, by ionization, the medium surrounding the conductive parts in which the arc is established. This requires operations of maintenance of the cut-off apparatus which are restrictive and costly.

The cut-off of the currents under high DC voltage (HVDC) is more complex to achieve than that of the currents under alternating voltage (AC). Indeed, during the cut-off of a current under AC voltage, a zero crossing of the current can be utilized to perform the electrical cut-off. that cannot be achieved with a current under high DC voltage.

The use of such an electrical cut-off apparatus, in particular a mechanical apparatus, without specific additional means to facilitate the cut-off, does not make it possible to obtain the desired performance in terms of electrical cut-off.

Furthermore, one objective of the invention is to allow current interruption regardless of the amplitude of the intensity of the fault current to be cut off, including for low values of the intensity of the fault current. Indeed, in some prior techniques based on the injection of a counter-current, the interruption of the low-intensity fault currents can be prevented or hampered by the injection of a counter-current of too high a value, in particular because the zero crossing of the current in the open switch takes place with a derivative of the intensity which is too great to allow interruption at the moment of this zero crossing.

PRIOR ART

For that purpose, many cut-off devices are known in which a main electrical cut-off apparaus is assisted by specific additional means which facilitate the cut-off. These specific additional means which facilitate the cut-off can be classified into different distinct families according to their main cut-off assistance mode.

In a first of these families, the additional specific means which facilitate the cut-off generate, after the mechanical opening of the main cut-off apparatus, a counter-current through the main apparatus, this counter-current must be in the opposite direction to the fault current and must be of greater intensity than the fault current to cancel this fault current.

An example of such a device is described in document EP3091626A1. This device includes:
- a main branch with a main electrical cut-off apparatus, of the mechanical type,
- an absorption branch, electrically in parallel with the main branch between the first point and the second point, with at least one general surge protector,
- a changeover branch, electrically in parallel with the main branch and the absorption branch, with a changeover capacitor, an inductor and a changeover switch.

The device of document EP3091626A1 includes a circuit for pre-charging the changeover capacitor. After the mechanical opening of the main cut-off apparatus, any arc that may be present between the electrodes thereof is cut off by the injection, into the main branch, of a counter-current which is generated by closing the changeover switch, which causes the discharge of the pre-charged changeover capacitor in the loop formed by the main branch and the changeover branch.

Document US2014299579 describes a similar device, which is based on the same principle of generating a counter-current, but which includes several banks of pre-charged capacitors. Depending on the current intensity to be cut off, this device inserts into the circuit a suitable capacitance by the selective closing of the capacitor switches so as to generate an adaptable counter-current intensity, this to have a derivative of the intensity which is low enough to allow the interruption at the moment of this zero crossing.

In document WO2015166600, a capacitor 10 is recharged by an auxiliary DC voltage source 20, before the closing of the changeover switch 17. Inductance bypass switches 15 and 16 are selectively closed to change the inductance of the LC circuit formed by the changeover branch, and the amplitude of the resulting oscillation current is thus monitored. To cover a large range of intensity values for which current interruption could be guaranteed, such a device would involve a high number of inductance bypass switches.

In this first family, it is understood that the energy that will make it possible to cut off the electric arc is stored beforehand in the pre-charged capacitor.

Documents WO2015185096, U.S. Pat. Nos. 3,758,790, and 4,442,469 describe cut-off modules which include at least two cut-off apparatuses in series in a main branch of the module, with a loop aimed at creating an oscillating current through these switches to interrupt the current. These three devices have the disadvantage that the changeover capacitor(s) must be capable of withstanding a voltage higher than the nominal operating voltage of the electrical network into which they are inserted, generally at least 1.6 times this nominal operating voltage. This involves expensive and bulky capacitors. In addition, changeover switches are present in the changeover branch, which requires auxiliary energy sources not described for their actuation. Furthermore, these cut-off modules still have a relatively long arc time in the cut-off apparatuses of the main branch. Furthermore, the arc extinction can only be carried out after the separation of the contacts has made it possible to reach a sufficiently high distance to be able to withstand a voltage higher than the nominal operating voltage, and this arc time is generally greater than a few milliseconds, which represents a relatively long time during which the arc is likely to cause significant heating and erosion of the electrodes.

In a second family of devices, the additional specific means which facilitate the cut-off comprise, in parallel with the main branch, a bypass branch which includes a bypass switch, but also comprise, in the main branch, in series with the main cut-off apparatus, an additional switch, often of the electronic type. This additional switch has the role of generating, in an open state, a voltage at its terminals. In this family, there is no need to provide for a capacitor in the bypass branch. In some documents of the prior art, for example document EP2502248, the bypass switch is designed as arrays of electronic switches, in parallel with the main cut-off apparatus and in parallel with an absorption branch.

Documents EP3522194 and EP3522196 both each describe a device of this second family, in which the bypass switch is designed as a plasma tube switch or, since the plasma tube switches are one-way switches by nature, of two plasma tube switches electrically mounted in parallel and in the opposite direction to each other.

In both documents, the cut-off device includes a control system for each plasma tube switch. Such a control system, intended to ensure the control and operation of the plasma tube switch requires a source of electrical energy. In document EP3522194, this source of electrical energy includes a first electric coil which is placed in the main circuit and a second electric coil which is inductively coupled to the first electric coil and which, by this inductive coupling, takes electrical energy in the first electric coil to provide it to the control system of the plasma tube switch. In document EP3522196, this source of electrical energy includes a capacitor which is arranged electrically in parallel directly with the electronic cut-off switch which is located in the main branch of the device. This capacitor is linked, via an electrical power converter, to the control system in order to provide it with the electrical power necessary for its operation. The electrical power required is high. It depends on the amplitude of the fault current that must be interrupted. The control system must, in these devices, provide a voltage of a few kV, for example between 1 and 10 kV, and must provide a current whose intensity is of the same order as that of the fault current to be cut off. In practice, such control systems should therefore provide electrical power of the order of a few tens of kW in pulses for the closing, but up to a few tens of megawatts (MW) in pulses for the opening command. Thus, in these solutions, the electrical power required to be provided by the coil and the capacitor is therefore very high. This therefore involves very high volume and cost for these components, and an undeniable complexity of the solution.

In both cases, it can be seen that the source of electrical energy necessary for the operation of the plasma tube switch is a source that requires interposing in the main branch of the device, or even in the main circuit, at least one electronic cut-off switch and optionally an electric coil. However, both the main branch and the main cut-off apparatus are traversed, in nominal operation of the installation, by the nominal current which is a current under high DC voltage and which can have a very high intensity, for example greater than 1,000 A, or even greater than 5,000 A. The electrical and electronic components which are thus interposed in the main branch or in the main circuit are therefore permanently traversed by this nominal current during the operation of the network. In this way, they must be dimensioned to be able to withstand this nominal current permanently. In addition, whatever the quality of these components, their presence is necessarily a source of loss of electrical energy in nominal operation. Finally, these electrical components are traversed by the nominal current under very high voltage, with intensities which are potentially very high, so that these components must generally be cooled, which increases the cost of the installation.

In a third family of devices, the specific additional means which facilitate the cut-off generate, after the mechanical opening of the main cut-off apparatus, an oscillating current of increasing amplitude in an oscillation branch in parallel with the main branch. When, after several oscillations, the oscillating current reaches a sufficient value, it in turn generates, through the main apparatus, a counter-current capable of canceling the fault current. Document US2017178844 describes an example of such a device. This device proposes to implement a specially piloted IGBT converter to create and amplify electrical oscillations in an LC circuit in parallel with the main cut-off apparatus. It is understood that this IGBT converter must generate currents of high intensity, of the order of that of the fault current, and is therefore bulky and expensive. In addition, the capacitance in the LC circuit must have a high voltage withstand, higher than the nominal operating voltage, generally higher than 1.6 times the nominal operating voltage.

Document U.S. Pat. No. 5,379,014A is also known, which describes a vacuum circuit breaker comprising an outer coil which is arranged outside a vacuum switch.

Document U.S. Pat. No. 4,805,062 A is also known, which relates to a direct current circuit breaker and a method for switching the latter, or more specifically a system for inserting a reverse current by the use of a changeover capacitor that can be directly charged from a DC line.

The aim of the invention is to propose a current cut-off device under high DC voltage which is based on the generation, after the mechanical opening of the main cut-off apparatus, of a counter-current through the main apparatus by using energy previously stored in a changeover capacitor, but which is economical, of reduced space requirement, and which does not generate electrical losses during the nominal operation of the installation.

Disclosure of the Invention

For the above purpose, the invention proposes a cut-off device for electric current under high DC voltage including:
 a main circuit, in which flows, in a conduction configuration of the cut-off device, an electric current under a high DC nominal operating voltage of the device;
 at least one cut-off module interposed in the main circuit between a first point and a second point of the main circuit, for the cut-off module, the cut-off module comprising:
  a main branch, between the first point and the second point of the cut-off module, with at least one main electrical cut-off apparatus, of mechanical type and interposed in the main branch between the first point and the second point,
  an absorption branch, electrically in parallel with the main branch between the first point and the second point of the cut-off module, with at least one general surge protector interposed in the absorption branch between the first point and the second point,
  a changeover branch, electrically in parallel with the main branch and the absorption branch between the first point and the second point of the cut-off module, with at least a first changeover capacitor arranged in the changeover branch, between the first point and the second point of the cut-off module, and a changeover switch capable of authorizing the flow of current in the changeover branch,
  a loop formed by the main branch and the changeover branch of the cut-off module, said loop of the cut-off module having a changeover inductance.

The invention is characterized in that:
 the changeover switch includes at least a first plasma tube switch including an anode, a cathode and a control grid, the first plasma tube switch being interposed in the changeover branch between the first point and the second point of the cut-off module so as to separate the changeover branch into a first section, linked to the cathode of the first plasma tube switch and a second section, linked to the anode of the first plasma tube switch, the first changeover capacitor being arranged in the first section of the changeover branch which is linked to the cathode of the first plasma tube switch,
 a control system of the first plasma tube switch is electrically supplied by the first changeover capacitor,
 the first changeover capacitor includes a proximal armature linked to the cathode of the first plasma tube switch, and a distal armature opposite to the cathode of the first plasma tube switch relative to the proximal armature,
 the device includes a circuit for pre-charging the first changeover capacitor,
 the cut-off module includes a first changeover surge protector which has a protection voltage lower than a nominal operating voltage of the cut-off module and which is electrically connected in parallel with the first changeover capacitor,
and in that the control system of the first plasma tube switch includes at least a first pilotable switch which, in a closed state, supplies the control grid of the first plasma tube switch by a voltage derived from an electric voltage between the armatures of the first changeover capacitor.

A device according to the invention can further comprise one or more of the following optional characteristics, taken alone or in combination.

In some cases, during an opening of the cut-off device, the first pilotable switch is piloted according to a first closure pulse to control the closing of the first plasma tube switch after a partial mechanical opening of the main electrical cut-off apparatus, and is piloted according to a second closure pulse to control the opening of the first plasma tube switch after reversal of the charge polarity of the first changeover capacitor, defining a conduction time of the first plasma tube switch between the closing and the opening of the first plasma tube switch.

In some cases, the first pilotable switch, in its closed state, electrically links the control grid of the first plasma tube switch to the distal armature of the first changeover capacitor.

In some cases, the first pilotable switch is a two-way switch capable of conducting and blocking the current in both directions between the control grid of the first plasma tube switch and the distal armature of the first changeover capacitor. In some variants of such a case, the first pilotable switch is designed as two one-way electronic switches interposed in series and in the opposite direction to each other, between the control grid of the first plasma tube switch and the distal armature of the first changeover capacitor, each one-way electronic switch being equipped with a free wheel diode mounted in antiparallel with the one-way electronic switch.

In some cases, the control system of the first plasma tube switch includes a supply branching which supplies a keep-alive electrode of the first plasma tube switch, the supply branching linking the keep-alive electrode of the first plasma tube switch to the distal armature of the first changeover capacitor. In some variants of such a case, the supply branching includes a supply switch capable of conducting and blocking the current in the supply branching, and a resistance interposed in the supply branching. In some versions of such a variant, the supply switch is closingly piloted after receipt of a current interruption order by the cut-off device In some cases, the control system of the first plasma tube switch includes a DC-DC power converter having a source side which is linked to the distal armature of the first changeover capacitor, and having a control side which supplies the control grid of the first plasma tube switch via the first pilotable switch. In some variants of such a case, the control side of the power converter includes a positive terminal and a negative terminal, and the first pilotable switch includes a first pilotable activation switch interposed between the positive terminal and the control grid of the first plasma tube switch, and a second pilotable deactivation switch interposed between the negative terminal and the control grid of the first plasma tube switch. In some versions of such a variant, the control system of the first plasma tube switch includes a supply branching which supplies a keep-alive electrode of the first plasma tube switch, the supply branching linking a keep-alive electrode of the first plasma tube switch to the positive terminal on the control side of the DC-DC power converter.

In some cases, the voltage at the terminals of the first changeover capacitor is limited, by the first changeover surge protector, to a protection voltage less than 10% of the nominal operating voltage of the cut-off module.

In some cases, the first changeover capacitor has a capacitance greater than 100 microfarads.

In some cases, the changeover inductance and the pre-charge voltage of the first changeover capacitor of the cut-off module are dimensioned to limit the rate of change of current through the main cut-off apparatus, change which appears when the changeover branch becomes conductive for the current by the closure of the plasma tube switch, at a value corresponding to the rate of change for which the main cut-off apparatus is capable of interrupting the electric arc.

In some cases, during an opening of the cut-off device, a conduction time of the first plasma tube switch is less than 1 millisecond, preferably less than 300 microseconds, more preferably less than 100 microseconds.

In some cases:
  the changeover switch comprises a second plasma tube switch including an anode, a cathode and a control grid, the second plasma tube switch being interposed in the changeover branch between the first point and the second point of the cut-off module, electrically in parallel with the first plasma tube switch, in the opposite direction to the first plasma tube switch, such that the cathode of the second plasma tube switch is linked to the second section of the changeover branch and such that the anode of the second plasma tube switch is linked to the first section of the changeover branch,
  a second changeover capacitor is arranged in the second section of the changeover branch which is linked to the cathode of the second plasma tube switch,
  a control system of the second plasma tube switch is electrically supplied by the second changeover capacitor;
  the second changeover capacitor includes a proximal armature linked to the cathode of the second plasma tube switch, and a distal armature opposite to the cathode of the second plasma tube switch relative to the proximal armature,
  the device includes a pre-charge circuit of the second changeover capacitor.
  the cut-off module includes a second changeover surge protector which has a protection voltage such that the sum of the protection voltages of the first changeover surge protector and of the second changeover surge protector is lower than the nominal operating voltage of the cut-off module and which is electrically connected in parallel with the second changeover capacitor, and the control system of the second plasma tube switch includes at least a second pilotable switch which, in a closed state, supplies the control grid of the second plasma tube switch by a voltage derived from an electric voltage between the armatures of the second changeover capacitor.

In some variants of such a case, the second pilotable switch, in its closed state, electrically links the control grid of the second plasma tube switch to the distal armature of the second changeover capacitor. In other variants of such a case, the control system of the second plasma tube switch includes a second DC-DC power converter having a source side which is linked to the distal armature of the second changeover capacitor, and having a control side which supplies the control grid of the second plasma tube switch via the second pilotable switch.

In some cases, the control system of the second plasma tube switch includes a supply branching which supplies a keep-alive electrode of the second plasma tube switch. In some variants of such a case, the supply branching links the keep-alive electrode of the second plasma tube switch to a positive terminal on the control side of the second DC-DC power converter.

In some cases, the at least one cut-off module includes at least one auxiliary changeover branch, electrically in parallel with the main branch, with the absorption branch and with the changeover branch between the first point and the second point of the cut-off module, with at least a first auxiliary plasma tube switch including an anode, a cathode and a control grid, the first auxiliary plasma tube switch being interposed in the auxiliary changeover branch between the first point and the second point of the cut-off module so as to separate the auxiliary changeover branch into a first section, linked to the cathode of the first auxiliary plasma tube switch, and a second section, linked to the anode of the first auxiliary plasma tube switch, and at least a first auxiliary changeover capacitor is arranged in the first section of the auxiliary changeover branch which is linked to the cathode of the first plasma tube switch.

In certain variants of such a case:
  the anode of the first auxiliary plasma tube switch is linked to the same point, among the first point and the second point of the cut-off module, as the anode of the first plasma tube switch of the at least one cut-off module;
  the at least one cut-off module includes a control system of the first auxiliary plasma tube switch supplied by the first auxiliary changeover capacitor,
  the first auxiliary changeover capacitor includes a proximal armature linked to the cathode of the first auxiliary plasma tube switch, and a distal armature opposite to the cathode of the first auxiliary plasma tube switch relative to the proximal armature,
  the device includes a pre-charge circuit of the first auxiliary changeover capacitor, the device includes a first auxiliary changeover surge protector which has a protection voltage lower than a nominal operating voltage of the cut-off module and which is electrically connected in parallel with the first auxiliary changeover capacitor, and the pre-charge circuit of the first changeover capacitor and the pre-charge circuit of the first auxiliary changeover capacitor include a common voltage source which supplies in parallel with the first changeover capacitor and the first auxiliary changeover capacitor.

In some cases, the at least one cut-off module includes, interposed in parallel and in the opposite direction to each other in the auxiliary changeover branch, two auxiliary plasma tube switches.

In some cases, the device includes several cut-off modules interposed in series in the main circuit, each between a first point and a second point of the main circuit for the considered cut-off module.

DESCRIPTION OF THE EMBODIMENTS

In an electrical network, the transmission of electrical power between two given points of the network is made by a power transmission line which generally comprises several electrical conductors, each of which corresponds to an electrical pole of the power transmission line. In all cases, within the meaning of the present text, an electrical conductor can be in the form of a single electrical conductor which extends between two distinct points of the considered network, or in the form of a set of electrical conductors which extend electrically in parallel between the same two distinct points of the considered network, all the conductors of the set being, at every instant, at the same electric potential.

Thus, in an HVDC network, the transmission of electrical power between two given points of the network is made by a power transmission line which, in many cases, includes two electrical poles, each pole comprising an electrical conductor which is extends between the two given points of the network. In this case, the power transmission line therefore includes two electrical conductors of different polarities, with, under charge, for example an electrical conductor which is at a positive potential and an electrical conductor which is at a negative or neutral potential. Still in an HVDC network unit, the transmission of electrical power between two given points of the network can also be made by a power transmission path with three electrical poles comprising three electrical conductors with, under charge, an electrical conductor which is at a positive potential, an electrical conductor which is at a negative potential, and an electrical conductor which is at a neutral potential. In some cases, the transmission of electrical power between two given points of the network can be made by a power transmission line at a single electrical pole, with an electrical conductor at the potential of the line and with a ground electrical return.

Figure 1:
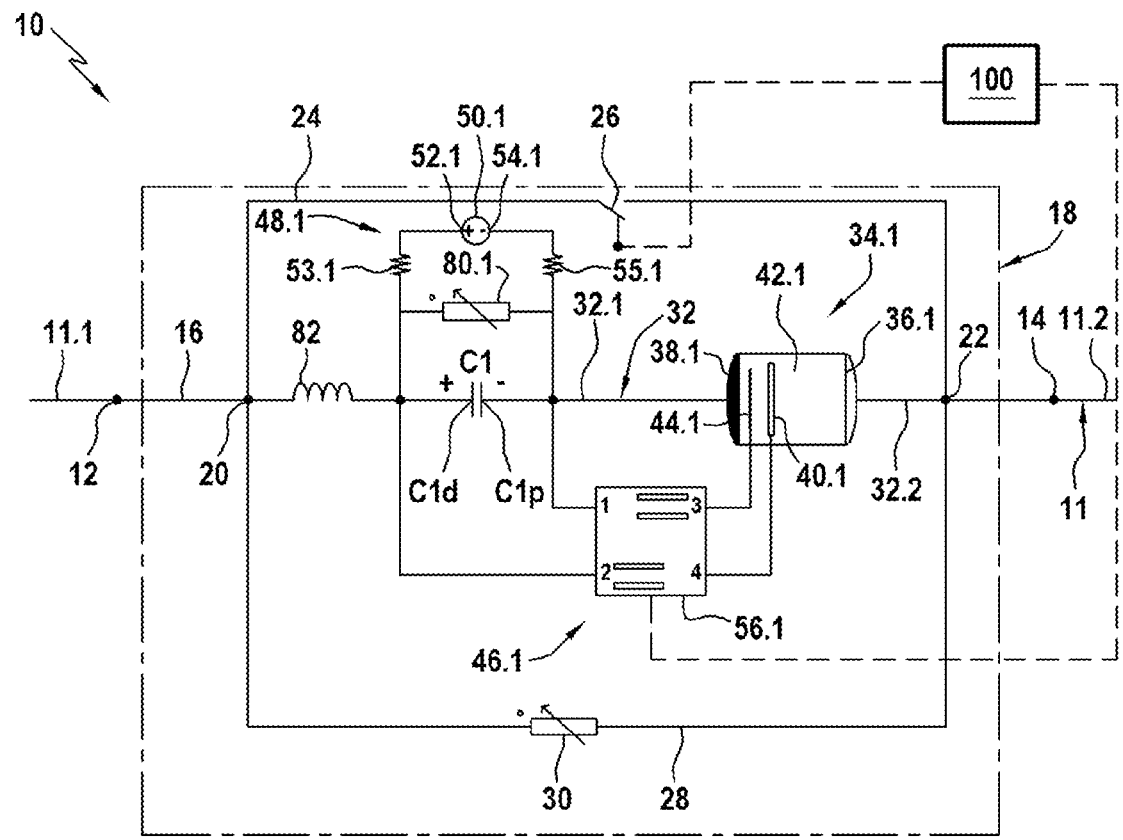
FIG. 1 is a schematic view of one exemplary embodiment of a one-way cut-off device according to the invention.

FIG. 1 illustrates a first exemplary embodiment of a cut-off device 10 for interrupting an electric current under high direct voltage flowing in an electrical conductor 11, which may for example belong to an electrical line of the electrical power transmission in an HVDC network unit that operates under a DC nominal operating voltage greater than 1,500 V, or even greater than 75,000 V (75 kV). The cut-off device 10 is therefore interposed in the electrical conductor 11, between a primary point 12 of the device 10 and a secondary point 14 of the device 10 which can be connection terminals of the device 10 respectively. The cut-off device 10 therefore divides the electrical conductor 11 into two segments, a first segment 11.1 which is connected to the primary point 12, and a second segment 11.2 which is connected to the secondary point 14. The cut-off device 10 therefore includes a main circuit 16, between the primary point 12 of the device 10 and the secondary point 14 of the device 10, in which flows, in a conduction configuration of the cut-off device 10, an operational electric current under a high DC nominal operating voltage of the cut-off device 10 (which is the high nominal operating voltage of the network), which is the operational electric current flowing in the conductor 11, and whose intensity is lower than or equal to the nominal intensity for the device. Indeed, depending on the instantaneous needs in the network, the operational intensity, the one that flows at a given instant in the conductor 11, can vary by being lower than or equal to the nominal intensity. On the other hand, in the event of an electrical fault, the intensity of the current through the cut-off device may exceed this nominal intensity for a short time. The cut-off device 10 is configured to fulfill the role of a circuit breaker, namely that it has the ability to interrupt a current of intensity higher than or equal to the nominal intensity, therefore either under charge at the normal intensity, or in the presence of a fault current of intensity higher than or equal to the nominal intensity. However, this same cut-off device remains capable of interrupting a current of intensity lower than or equal to the nominal intensity.

The cut-off device 10 includes at least one cut-off module 18 which is interposed in the main circuit 16 between a first point 20 and a second point 22 of the main circuit 16 for the cut-off module 18. In the example of FIG. 1, which includes only one cut-off module 18, the first point 20 and a second point 22 of the main circuit 16 are points of the main circuit 16 which are respectively at the same electric potential as, respectively, the primary point 12 and the secondary point 14 of the cut-off device 10 which delimit the main circuit 16 of the cut-off device 10.

It will be seen later with reference to FIG. 7 that the cut-off device can include several cut-off modules 18a, 18b, 18c, . . . , which can be arranged electrically in series in the main circuit 16, between the primary point 12 and the secondary point 14 of the cut-off device 10.

A cut-off module 18 comprises at least three branches which are electrically in parallel with each other between the first point 20 and the second point 22.

A cut-off module 18 comprises a main branch 24, between the first point 20 and the second point 22, with at least one main cut-off apparatus 26, which is interposed in the main branch 24 between the first point 20 and the second point 22, and which is of the mechanical type to ensure the electrical cut-off in the main branch 24. The main cut-off apparatus 26 can switch between a closed state, in which it allows the flow of the electric current in the main branch 24, and an open state in which it ensures the electrical cut-off in the main branch 24 by interrupting the flow of electric current at the moment of a zero crossing of the intensity in the main branch 24. The main branch 24 of the module 18 is the one in which the operational current flows in normal operation of the network when the cut-off device 10 is in its conduction configuration. In normal operation of the network, when the cut-off device 10 is in its conduction configuration, the main cut-off apparatus 26 is therefore traversed by the operational current flowing in the electrical conductor 11, according to a steady or quasi-steady state.

In the main cut-off apparatus 26 of the mechanical type, the electrical cut-off is obtained by displacement, in particular by spacing, of one or more pairs of electrical contacts. The displacement of the electrical contacts is generally carried out by maneuvering members or mechanical, pneumatic, hydraulic or electrical actuators, possibly through movement transfer kinematics. This displacement can be electronically monitored, for example by an electronic control unit 100. As indicated above, in the presence of a current and/or a high voltage, the mechanical separation of the electrical contacts can result in the establishment an electric arc between the two electrical contacts of the apparatus, due to the high energies accumulated in the network that the device protects. As long as the electric arc remains established through the mechanical separation, the main cut-off apparatus 26 does not perform the electrical cut-off since a current continues to flow through the switch by the presence of the arc. As will be seen later, the invention provides means for ensuring the electrical cut-off, in the sense of the effective interruption of the flow of electric current. The main cut-off apparatus 26 may consist of a single main cut-off apparatus, or may consist of several main electrical cut-off apparatuses arranged electrically in series and/or in parallel. The main cut-off apparatus 26 can be an apparatus called "metal-enclosed" apparatus where the electrical contacts are enclosed in a sealed enclosure filled with an insulating fluid, or even, more preferably, a "vacuum" apparatus (sometimes called a "vacuum bulb") where the electrical contacts are enclosed in a sealed enclosure in which the pressure is lower than the atmospheric pressure, in particular less than 100 millibars, in particular less than 10 microbars. The main cut-off apparatus 26 will be advantageously capable of interrupting the electric arc of a current having, at the moment of a zero crossing of the intensity, a high rate of change of intensity (di/dt), typically with a rate of change of intensity greater than or equal to 100 A per microsecond.

A cut-off module 18 also includes an absorption branch 28, which is arranged electrically in parallel with the main branch 24 between the first point 20 and the second point 22 of the considered cut-off module 18, with at least one general surge protector 30 interposed in the absorption branch 28 between the first point 20 and the second point 22 of the considered module.

Such a general surge protector 30 makes it possible to limit the amplitude of the potential difference at the terminals of any component or set of components in parallel with which it is arranged. A surge protector, or "voltage surge arester", is therefore a device that limits voltage peaks at its terminals. A surge protector generally comprises an electrical component thay has a variable resistance depending on the electric voltage at its terminals. The change of the resistance value is generally not linear with the electric voltage at the terminals of the surge protector. Generally, below a transition voltage at the terminals of the surge protector, the resistance of the latter is high, with no or relatively small decrease in its resistance as a function of the increase in voltage, and the surge protector lets pass only a leakage current, preferably less than 1 ampere (A), or even less than 100 milliamperes (mA). On the contrary, above the transition voltage at the terminals of the surge protector, the resistance of the latter decreases rapidly as a function of the voltage increase which reaches a clipping voltage value, or protection voltage, for which the resistance of the surge protector becomes low even very low. In other words, the surge protector acts as a voltage limiter at its terminals over the current intervalle for which it has been chosen. It opposes the protection voltage when passing the highest current for which the surge protector has been dimensioned. Below the transition voltage, it tends to prevent the passage of the current. Beyond the transition voltage, it allows the passage of the current through the surge protector for a small increase in the voltage at its terminals. As is known, the transition voltage is generally not a precise value but rather corresponds to a transition voltage range. However, in the present text, it will be defined that the transition voltage of a surge protector is the voltage for which the surge protector lets a current of 1 ampere (A) pass therethrough. The protection voltage is the voltage across the terminals of the surge protector when it is traversed by the highest current for which it has been dimensioned. Among the surge protectors, surge arresters are known in particular, which may in particular comprise varistors and TVS (Transient Voltage Suppressor) diodes, such as "Transil™" diodes. In particular, within the scope of the invention, a surge protector, in particular the general surge protector 30 can comprise a metal oxide varistor (or MOV). The general surge protector 30 can be designed as a set of several discrete components arranged electrically in series and/or in parallel. Each discrete component is for example a surge arrester, in particular a varistor, such as a metal oxide varistor, or a "TVS" diode. Preferably, the set of several discrete components arranged electrically in series and/or in parallel has, from the point of view of the rest of the device, the behavior of a single surge protector having an equivalent transition voltage for the set and a protection voltage for the set.

Figure 3:
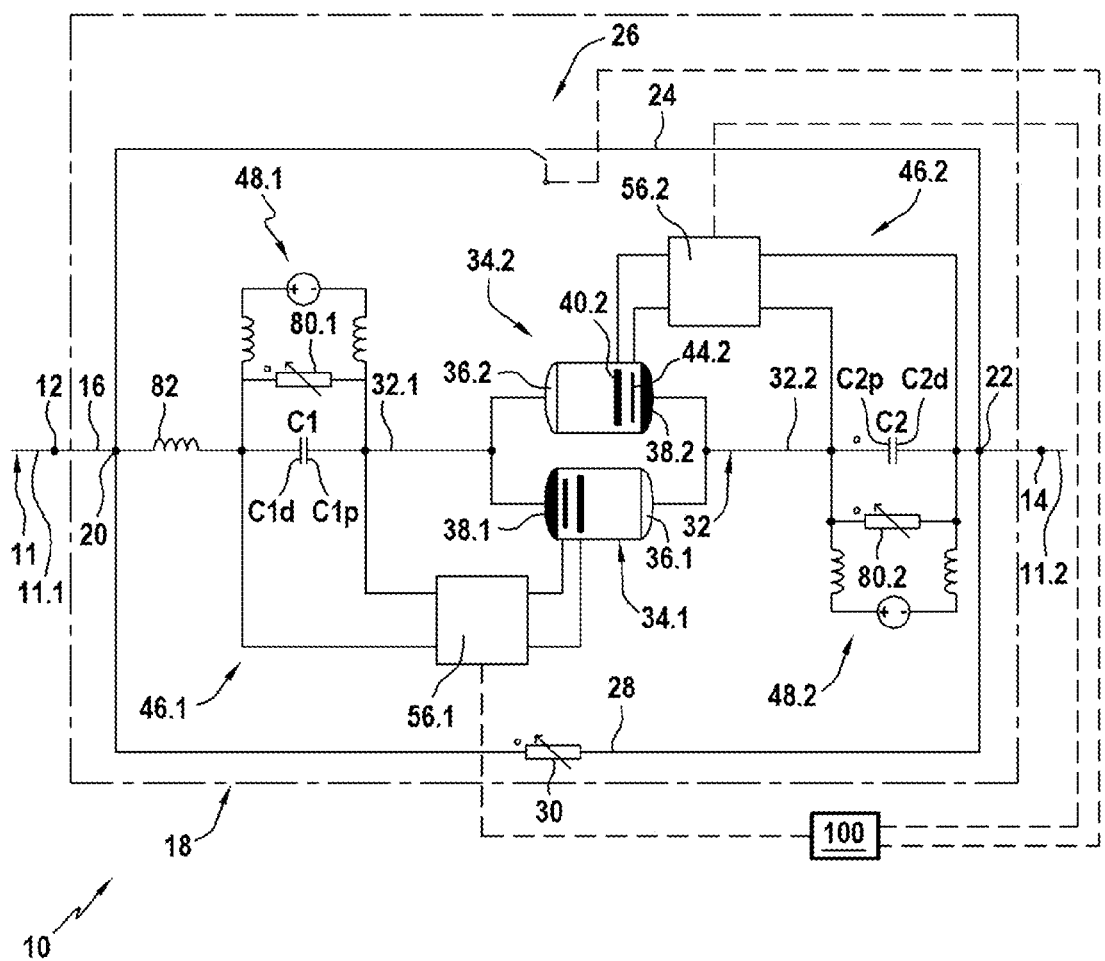
FIG. 3 is a schematic view of one exemplary embodiment of a two-way cut-off device according to the invention.
Figure 6:
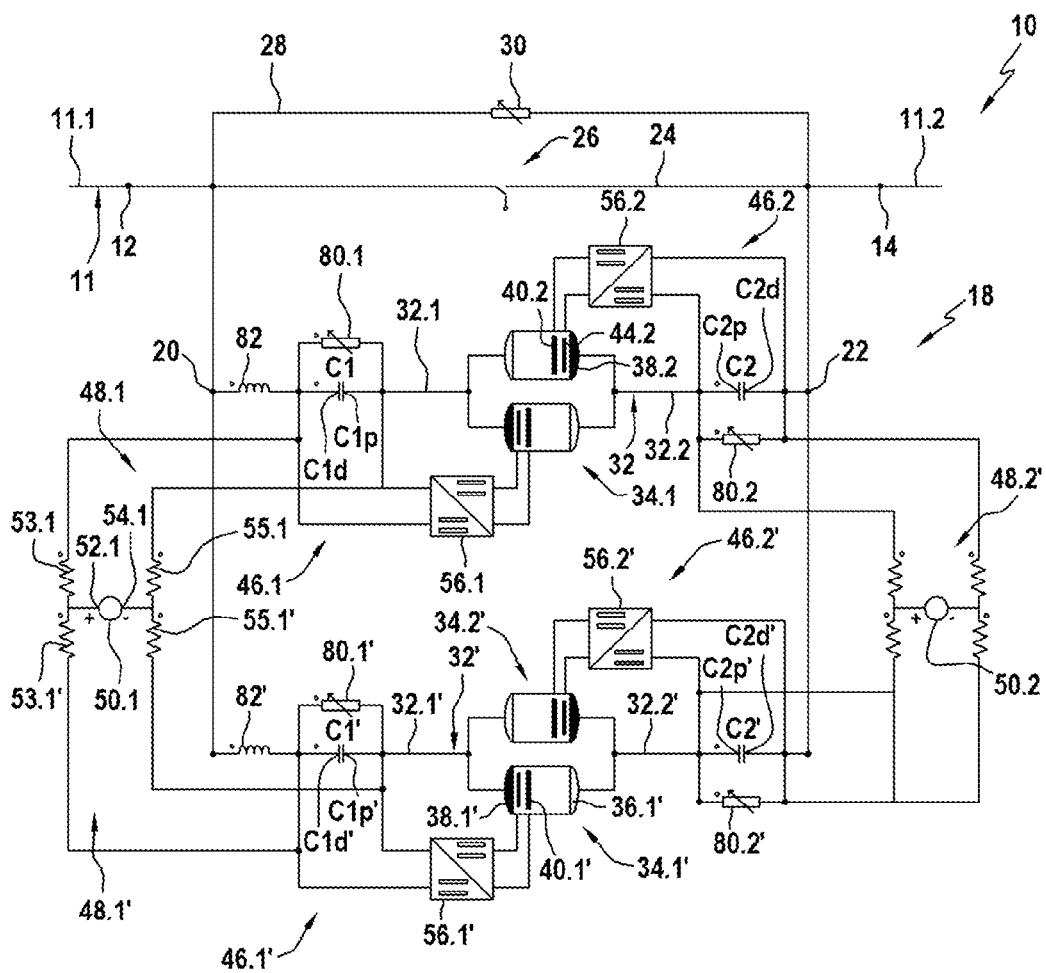
FIG. 6 is a schematic view of one exemplary embodiment of a two-way cut-off device according to the invention, having an auxiliary changeover branch.

As can be seen in the figures, the absorption branch does not include a switch. Therefore, it is necessary to choose the general surge protector 30 such that its transition voltage is higher than the voltage likely to appear at the terminals of the cut-off module 18 when the cut-off device 10 is operating and in the electrical opening configuration under the nominal operating voltage of the network. For example, the general surge protector 30 is chosen such that its protection voltage is comprised between 1.2 and 2 times, for example 1.6 times the nominal operating voltage of the module 18 which is the voltage under which the cut-off module 18 operates when the cut-off device 10 is operating under the nominal operating voltage of the network. In cases where the cut-off device 10 includes only a single cut-off module 18, as illustrated in FIGS. 1, 3 and 6, the nominal operating voltage of the module 18 is equal to the nominal operating voltage of the cut-off device 10 and is equal to the nominal operating voltage of the network. In the cases where the cut-off device 10 includes several cut-off modules 18*a*, 18*b*, 18*c*, as illustrated in FIG. 7, the nominal voltage of each module 18*a*, 18*b*, 18*c*, which is the voltage likely to appear at the terminals of each cut-off module 18*a*, 18*b*, 18*c*, when the cut-off device 10 is operating and in electrical opening configuration under the nominal operating voltage of the network, is only a fraction of the nominal operating voltage of the cut-off device 10, therefore a fraction of the nominal operating voltage of the network since this voltage is then distributed between the different cut-off modules 18*a*, 18*b*, 18*c*.

Due to the presence of the general surge protector 30 interposed in the absorption branch 28, and due to the choice of its transition voltage value, it can be considered that, in normal operation of the network when the cut-off device 10 is in its conduction configuration, no electric current flows in the absorption branch.

A cut-off module 18 according to the invention further includes at least one changeover branch 32 which is arranged electrically in parallel with the main branch 24 and the absorption branch 28 between the first point 20 and the second point 22 of the considered cut-off module 18.

There are, electrically interposed in series in the changeover branch 32, between the first point 20 and the second point 22, a first changeover capacitor C1 and a changeover switch which is designed as at least a first plasma tube switch 34.

Plasma tube switches are described in documents U.S. Pat. No. 5,828,176A (Planar crossed-field plasma switch) or U.S. Pat. No. 10,256,067 and US2019/0295801 (gas switch), to which reference may be made. In general, a plasma tube switch, and therefore the first plasma tube switch 34.1, includes an anode 36.1, a cathode 38.1, and a control grid 40.1 in a sealed enclosure 42.1 containing a fluid which can be ionized to generate a plasma, for example helium, nitrogen, etc. . . . The control grid 40.1 is generally arranged between the anode 36.1 and the cathode 38.1 such that when a control voltage is transiently applied to the control grid 40.1, a plasma path is initiated between the anode 36.1 and cathode 38.1 to conduct a large electric current between the anode 36.1 and the cathode 38.1. The plasma path can be interrupted by causing a reverse polarization of the control grid 40.1, therefore by sending a reverse control voltage, so that the electric current flowing from the anode 36.1 to the cathode 38.1 is temporarily taken by the control grid 40.1, allowing the fluid which was previously ionized between the control grid 40.1 and the anode 36.1 to become insulating again. Thus, a plasma tube switch 34.1 can be controlled towards an open state, in which it interrupts any passage of current between its anode 36.1 and its cathode 38.1, or towards a closed state, in which it authorizes the passage of current between its anode 36.1 and its cathode 38.1, this control being carried out by the value and the polarity of the voltage applied to the control grid 40.1. For example, a plasma tube switch 34.1 can be of the "cross-field switch" type, magnets are arranged to generate a magnetic field which is parallel to the conduction surface of one of the electrodes of the plasma tube switch, and this magnetic field is therefore perpendicular to the electric field generated by the voltage between the two electrodes 36.1, 38.1. In some cases, the plasma tube switch 34.1 also includes, in the sealed enclosure 42.1, a keep-alive electrode 44.1 whose role is to maintain, between the keep-alive electrode 44.1 and the cathode 38.1, weak plasma. The current intensity of this plasma is of the order of magnitude of a few milliamperes to a few amperes, and depends on the type of gas and on the gas pressure in the sealed enclosure 42.1. In all cases, the principle of operation of a plasma tube switch is based on the possibility, by applying to the control grid 40.1 a closing potential which generates a positive voltage relative to the cathode, to create a plasma that starts a conduction of an electric current between the anode 36.1 and the cathode 38.1. On the contrary, by applying to the control grid 40.1 an opening potential that generates a negative voltage relative to the cathode, the interruption of this plasma is caused, which restores the electrical insulation between the anode 36.1 and the cathode 38.1 and thus interrupts any passage of current between the anode 36.1 and the cathode 38.1 of the plasma tube switch 34.1. Only then remains the possible plasma current between the keep-alive electrode 44.1 and the cathode 38.1 if a voltage supply is applied to the possible keep-alive electrode 44.1.

A plasma tube switch 34.1 has the great advantage of being able to be designed to interrupt with certainty, in a very short time, high currents, for example greater than 500 A, for example of the order of 1,000 A, under a DC voltage equal to or greater than 50,000 volts (50 kV), with currently known constructions. There is no doubt that larger dimensioning is possible, but today at less advantageous economic conditions. In this way, if the cut-off device must be dimensioned to interrupt larger currents, it will be possible to implement a cut-off module 18 including several changeover branches in parallel, each equipped with at least a plasma tube switch, to thus distribute the intensity between several changeover branches operating in parallel, therefore between several plasma tube switches in parallel. In addition, once in its open state, a plasma tube switch can be designed, with currently available technologies, to withstand a voltage at its terminals of more than 50 kV, or even more than 100 kV. If the cut-off device must be dimensioned to withstand higher voltages, it is possible, as illustrated in FIG. 7, to implement a cut-off device 10 including several cut-off modules 18*a*, 18*b*, 18*c*, . . . , electrically arranged in series in the main circuit 16 of the cut-off device 16, each cut-off module being equipped with at least a plasma tube switch, so as to distribute the voltage between several plasma tube switches in series.

The voltage drop at the terminals between the anode 36.1 and the cathode 38.1 of a plasma tube switch 34.1, when it is traversed by a current, is significant and is for example comprised between 50V and 1,000V. This voltage drop voltage depends on certain characteristics of the plasma tube switch, in particular the pressure and the type of gas in the sealed enclosure, the material of the cathode38.1, etc. . . . This voltage drop generates a significant energy dissipation during the conduction time of the plasma tube switch 34.1, and if the conduction time is long, may cause damage to the electrodes in the plasma tube. In this way, it is conceivable that it appears preferable that the conduction time of the plasma switch is as short as possible if it is desired to contain its volume and its cost.

Furthermore, the current intensity that it is necessary to provide to the control grid 40.1 of the plasma tube is high, with an intensity of a few tens of amperes necessary for the control of the closing, to allow it to conduct the current between its anode and its cathode, and an intensity equivalent to that of the anode current necessary for the control of opening of this plasma tube switch, i.e. to allow it to interrupt the current between its anode and its cathode, therefore of the same order of magnitude as that of the fault current to be cut.

It is noted that, as described above, a plasma tube switch allows the passage of a current only in one direction between its anode and its cathode: it allows the passage of a flowing current of its anode (where the electrons will exit the plasma tube switch) to its cathode (where the electrons will enter the plasma tube switch).

Therefore, it will be seen that the first embodiment of the invention which is illustrated in FIG. 1 only makes it possible to interrupt a fault current, in the case where the conductor 11.1 is a positive conductor potential in the power transmission line, only if the fault is located in the first segment 11.1 of the electrical conductor 11. For the case where the conductor 11.1 is a conductor at a negative potential in the power transmission line, the first embodiment of the invention which is illustrated in FIG. 1 would make it possible to interrupt a fault current only if the fault was located in the second segment 11.2 of the electrical conductor 11. Indeed, the first embodiment of the invention which is illustrated in FIG. 1 allows a fault current to be interrupted only if it flows in the direction going from the second point 22 to the first point 20.

The first plasma switch 34.1 is arranged in the changeover branch 32 so as to separate the changeover branch 32 into a first section 32.1, linked to the cathode 38.1 of the first plasma tube switch 34.1, and a second section 32.2, linked to the anode 36 of the first plasma tube switch 34.1. In the examples illustrated, the first section 32.1 of the changeover branch 32 therefore links the cathode 38.1 of the first plasma tube switch 34.1 with the first point 20 of the cut-off module 18, and the second section 32.2 of the changeover branch 32 links the anode 36.1 of the first plasma tube switch 34.1 with the second point 22 of the cut-off module 18.

To control the first plasma switch 34.1, the cut-off module 18 of the cut-off device 10 includes a control system 46.1 of the first plasma tube switch 34.1. This control system 46.1 has the function of monitoring in particular the electric potential applied to the control grid 40.1 of the first plasma tube switch 34.1, in order to control the plasma switch either in its open state or in its closed state.

As will be understood later, the first plasma tube switch 34.1 is intended to be controlled towards its closed state, authorizing the passage of current therethrough, only in the switching phases of the main cut-off apparatus 26, in particular in a phase of switching the main cut-off apparatus 26 from its closed state to its open state. Apart from these switching phases, in particular in a nominal conduction phase when the main cut-off apparatus 26 is maintained in its closed state to let an operational electric current flowing the electrical conductor 11 flow therethrough, or in an isolation phase in which the main cut-off apparatus 26 is maintained in its open state to interrupt the flow of current in the electrical conductor 11, the first plasma tube switch 34.1 is intended to be maintained in its open state, so that no current flows in the changeover branch 32.

In this way, the control system 46.1 must include at least one source of electric potential and at least one pilotable switch in order to be able to control the electric potential applied to the control grid 40.1 of the first plasma tube switch 34.1.

The control system 46.1 of the first plasma tube switch 34.1 is electrically supplied by the first changeover capacitor C1 arranged in the first section 32.1 of the changeover branch 32 which is linked to the cathode 38.1 of the first plasma tube switch 34.1. Conventionally, the first changeover capacitor C1 includes two conductive armatures C1$p$, C1$d$ arranged facing each other and separated by an electrical insulator, with a proximal armature C1 linked to the cathode 38.1 of the plasma tube switch 34.1, and a distal armature C1$d$ opposite to the cathode 38.1 of the plasma tube switch relative to the proximal armature C1$p$. The distal armature C1$d$ of the first changeover capacitor C1 is therefore linked to the first point 20 of the cut-off module 18. with, in the illustrated embodiment, the interposition of an optional coil 82 which will be discussed below. Of course, the first changeover capacitor C1 can be designed as a set of several discrete capacitors electrically arranged in series and/or in parallel relative to each other, the first changeover capacitor C1 as discussed later being then the capacitor electrically equivalent to this set. The first changeover capacitor C1 therefore plays, among other things, the role of a source of electric potential intended to be applied to the control grid 40.1 of the plasma tube switch 34.1. In addition to this first function which is to constitute a voltage source for the control system 46.1 of the first plasma tube switch 34.1, it will be seen that it also performs a second function comprising the generation of a current oscillating in the changeover branch 32 to inject a counter-current into the main branch 24, this in order to promote the extinction of the electric arc likely to appear between the electrodes of the main cut-off apparatus 26 at the moment of its opening.

As will be seen later, the control system 46.1 includes a pre-charge circuit 48.1 of the first changeover capacitor C1. This pre-charge circuit 48.1 makes it possible to install between the two armatures C1$p$, C1$d$ of the changeover capacitor C1, before any changeover of the main cut-off apparatus 26, a predetermined electric voltage, sufficient to provide the electric potential necessary for the control of the plasma tube switch 34.1, in particular sufficient to control the passage of the plasma tube switch 34.1 to its closed state. In the example, the pre-charge circuit 48.1 includes a DC voltage source 50.1 which includes a positive terminal 52.1 which is linked, in this embodiment, to the distal armature C1$d$ of the changeover capacitor C1, here through a resistance 53.1, and a negative terminal 54.1 which is linked, in this embodiment, to the proximal armature C1$p$ of the changeover capacitor C1, here also through another resistance 55.1. The resistances 53.1, 55.1 of the pre-charge circuit 48.1 may have the same resistance value, or may have different values. In practice, only one of the two resistances may suffice. The resistance(s) 53.1, 55.1 have the role of limiting the charge/discharge current to be provided by the DC voltage source 50.1. In this embodiment, which is designed to allow a fault current to be interrupted only if the fault current flows in the direction going from the second point 22 to the first point 20, the pre-charge circuit 48.1 therefore ensures a precharging of the changeover capacitor C1 such that the distal armature C1$d$ of the changeover capacitor C1 is positively charged relative to the proximal armature C1$p$.

The control system 46.1 of the first plasma tube switch 34.1 includes at least a first pilotable switch 58.1 which, in a closed state, supplies the control grid 40.1 of the first plasma tube 34.1 with a voltage derived from a electric voltage between the armatures of the first changeover capacitor C1.

In general, the first pilotable switch 58.1 is piloted according to a first closure pulse to control the closing of the first plasma tube switch 34.1, and is piloted according to a second closure pulse to control the opening of the first plasma tube switch 34.1, after reversal of the charge polarity of the first changeover capacitor C1.

In general, the control system 46.1 can take different forms. Among these different possible forms, two families of embodiments can in particular be identified for the control system 46.1: a first family of embodiments which ensures a direct connection, via the pilotable switch 58.1, between the distal armature C1d of the changeover capacitor C1 and the control grid 40, and a second family of embodiments which ensures an indirect connection between the changeover capacitor and the control grid 40.1 of the plasma tube switch 34.1, via an electrical power converter and a pilotable switch. These two families have in common to interpose a pilot 56.1 between the changeover capacitor C1 and the plasma tube switch 34, this pilot 56.1 comprising the first pilotable switch 58.1.

The first pilot family 56.1 can for example take either of the forms illustrated respectively in FIGS. 2A, 2B, 2C, 2D and 2E, including their possible variants.

Figure 2A:
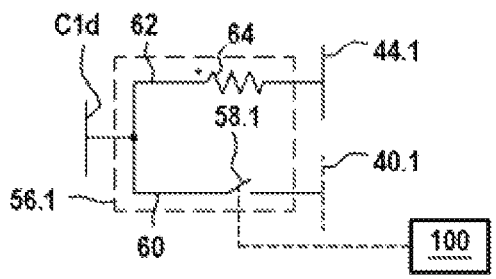
FIGS. 2A to 2E represent various embodiments of a first family of pilots for a system for controlling a plasma tube switch in a cut-off device according to the invention.

In FIG. 2A, one embodiment is illustrated in which the pilot 56.1 can take the form of a simple pilotable switch 58.1 interposed in a conductor 60 linking the distal armature C1d of the changeover capacitor C1 to the control grid 40.1 of the plasma tube switch 34.1. Preferably, the first pilotable switch 58.1 is a two-way switch capable of conducting and blocking the current in both directions between the control grid 40.1 of the first plasma tube switch 34.1 and the distal armature C1d of the first changeover capacitor C1. A temporary closing of the first pilotable switch 58.1 makes it possible to monitor the closing and the opening of the first plasma tube switch 34. In the initial state, it is considered that the distal armature C1d is in positive polarity relative to the cathode 38.1 of the first plasma tube switch 34.1, so that the temporary closing of the pilotable switch 58.1 makes it possible to generate a positive pulse voltage on the control grid 40.1 to control the closing of the first plasma tube switch 34.1, which becomes conductive for any electric current going from its anode 36.1 to its cathode 38.1. Such a current is therefore then likely to pass through the plasma tube switch 34.1 and is likely to invert the voltage between the armatures C1d, C1p of the first changeover capacitor C1, so that the distal armature C1d then has a negative polarity relative to the cathode 38.1. In this way, starting from this state, a temporary closing of the first pilotable switch 58.1 makes it possible to apply a negative voltage to the control grid 40.1 to control the opening of the plasma tube switch 34.1, which interrupts any passage of electric current therethrough.

This FIG. 2A illustrates a variant which can be implemented in the case where the first plasma tube switch 34.1 furthermore includes a keep-alive electrode 44.1. In this case, the pilot 56.1 can advantageously include a supply branching 62 which supplies the keep-alive electrode 44.1 of the first plasma tube switch 34.1. In the example illustrated, the supply branching 62 includes a resistance 64 interposed in a conductor that links the distal armature C1d of the changeover capacitor C1 to the control grid 40.1 of the first plasma tube switch 34.1. Typically, the resistance 64 will be dimensioned so that the supply current of the keep-alive electrode 44.1 has an intensity comprised between 1 milliampere and 1 ampere.

Figure 2B:
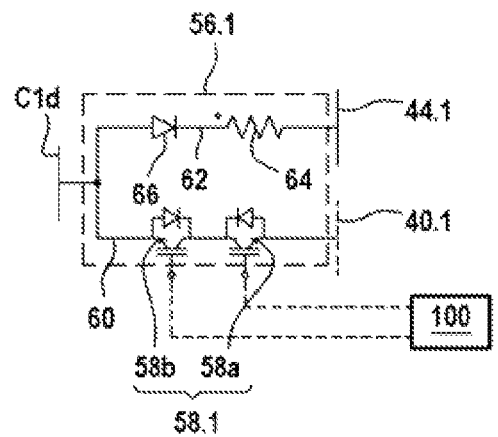

FIG. 2B illustrates a variant of the pilot 56.1 in which the first pilotable switch 58.1 is designed as two one-way electronic switches 58a, 58b, for example IGBTs (Insulated Gate Bipolar Transistor) electrically interposed in series and in the opposite direction to each other, between the control grid 40.1 of the first plasma tube switch 34.1 and the distal armature C1d of the first changeover capacitor C1, each IGBT 58a, 58b being equipped with a free wheel diode mounted in antiparallel with the IGBT. In operation, the two IGBTs 58a, 58b are normally open. One of the two IGBTs 58a, 58b is controlled towards its closed state to control the closing of the first plasma tube switch 34.1, while the other of the two IGBTs 58a, 58b is controlled towards its closed state to control the opening of the first plasma tube switch 34.1. The design of the first pilotable switch 58.1 in the form of two one-way electronic switches makes it possible, in a simple and economical way, to authorize precise piloting of the changeover instants of the first plasma tube switch 34.1.

In this same FIG. 2B, independently of the particular embodiment of the pilotable switch 58.1 illustrated in this figure, it has been illustrated that the supply branching 62 that supplies the possible keep-alive electrode 44.1 may include a diode 66 letting the current flow in the branching 62 only from the distal armature C1d of the changeover capacitor C1 to the keep-alive electrode 44.1, in the cases of course where the plasma tube switch 34.1 includes such a keep-alive electrode 44.1. The presence of this diode 66 makes it possible to maintain the plasma inside the plasma tube switch 34.1, this even when the voltage at the terminals of the first changeover capacitor C1 is inverted, which makes it possible to ensure that the first plasma tube switch 34.1 remains in its closed configuration allowing the passage of the current therethrough.

Figure 2C:
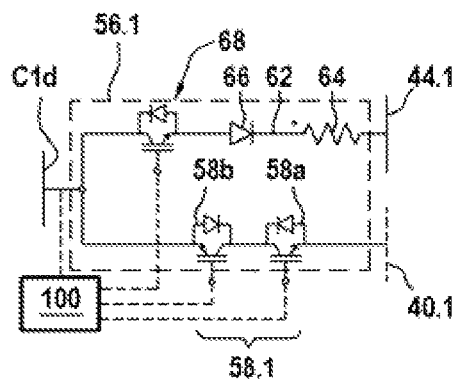

FIG. 2C illustrates a variant of the pilot 56.1 in which the supply branching 62 which supplies the possible keep-alive electrode 44.1 includes a supply switch 68 to control the supply or not of the keep-alive electrode 44.1. In this example, the supply switch 68 is associated in series in the supply branching 62 with a diode 66 letting the current flow in the branching 62 only from the distal armature C1d of the changeover capacitor C1 towards the keep-alive electrode 44.1. Moreover, the supply switch 68 which controls the supply or not of the keep-alive electrode 44.1 can be designed as an electronic switch, for example in the form of an IGBT equipped with a free wheel diode mounted in antiparallel with the IGBT and in the opposite direction to the diode 66. In its closed state, the supply IGBT 68 short-circuits the free wheel diode to allow the current to flow in the branching 62 from the distal armature C1d of the changeover capacitor C1 to the keep-alive electrode 44. The supply switch 68 which controls the supply or not of the keep-alive electrode 44.1 can thus be brought into its closed state, to supply the keep-alive electrode 44.1 just before a command to close the plasma tube switch 34.1. For example, the supply switch 68 is brought into its closed state between 100 microseconds (μs) and 10 milliseconds (ms) before a command to close the plasma tube switch 34.1. This ensures good control of the changeover instant of the plasma tube switch 34.1 to its closed state.

Figure 2D:
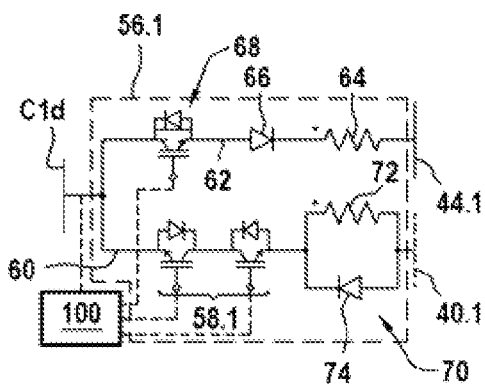
Figure 2E:
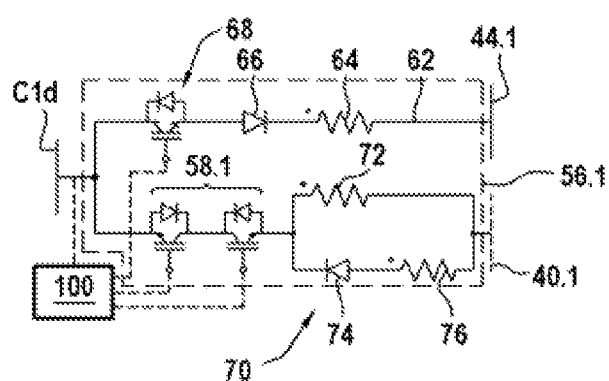

FIG. 2D illustrates a variant of the pilot 56.1 into which there was inserted, in series with the first pilotable switch 58.1 in the conductor 60 linking the distal armature C1d of the changeover capacitor C1 to the control grid 40.1 of the plasma tube switch, a current limiter 70 which will prevent a too rapid discharge of the capacitor C1 and may limit the intensity through the pilotable switch 58.1. In the example, this current limiter is an asymmetrical limiter which limits the current only in the direction going from the distal armature C1d of the changeover capacitor C1 to the control grid 40.1 of the first plasma tube switch 34.1, therefore only during a command to close the first plasma tube switch 34.1. This is advantageous because the current required for the command to close a plasma tube switch is generally much lower than the ine required for an opening command: For this, the current limiter 70 includes, in parallel to each other, a resistance 72 and a diode 74, the diode 74 short-circuiting the resistance 72 when the current flows from the monitoring grid 40.1 to the distal armature C1d of the first changeover capacitor C1. In this FIG. 2D, the current limiter 70 offers no resistance during the opening of the first plasma tube switch 34.1. In the variant illustrated in FIG. 2E, the current limiter 70 remains asymmetrical, with a second resistance 76 which is arranged in series in the current limiter 70 with the diode 74, the second resistance 76 and the diode 74 being in parallel with the first resistance 72. The first resistance 72 and the second resistance 76 therefore make it possible to define independently of each other the current limiting values in both directions between the first changeover capacitor C1 and the control grid 40.1 of the first plasma tube switch 34.1, to adjust as closely as possible the current provided to the control grid 40.1 to the one that is respectively necessary for the closing command and for the opening command while protecting the pilotable switch 58.1. In practice, the second resistance 76 will be generally dimensioned to have a lower resistance value than the first resistance 72.

Figure 2F:
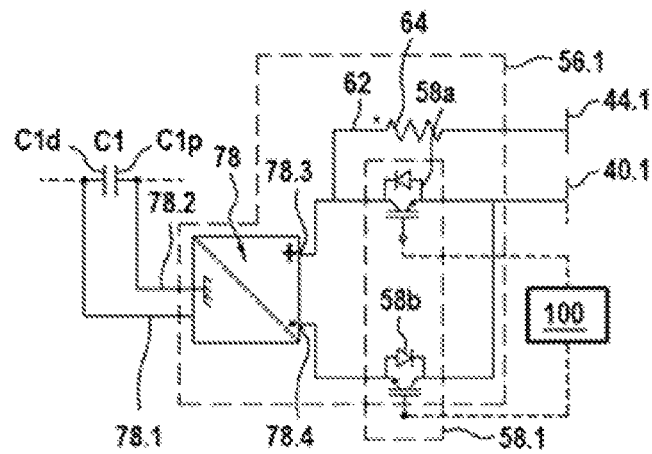
FIGS. 2F to 2H represent various embodiments of a second family of pilots for a system for controlling a plasma tube switch in a cut-off device according to the invention.
Figure 2G:
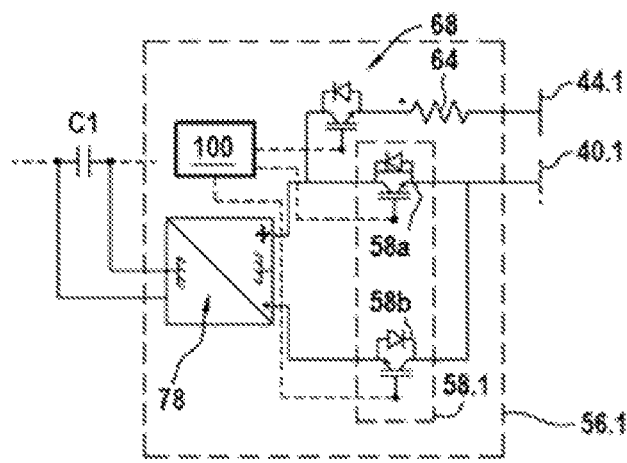
Figure 2H:
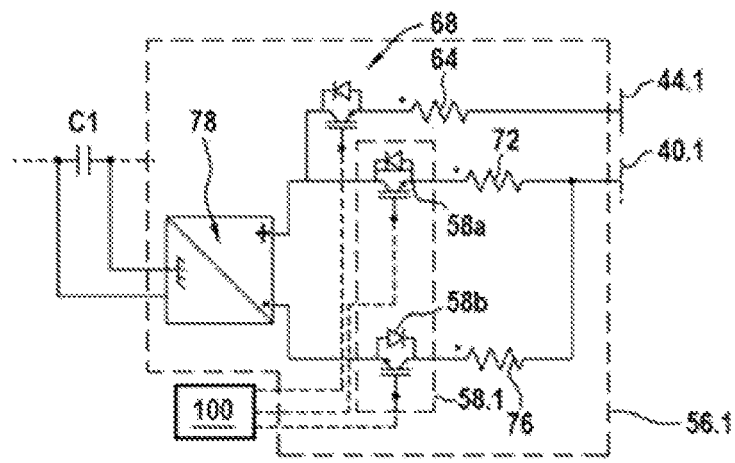

The second family of pilots 56.1 can for example take either of the forms illustrated respectively in FIGS. 2F, 2G, and 2H, including their possible variants.

In these embodiments, the control system 46.1 of the first plasma tube switch 44.1 includes a DC-DC power converter 78 having a source side which is electrically linked to the distal armature C1d of the first changeover capacitor C1, and having a command side which supplies the control grid 40.1 of the first plasma tube switch 34.1 via the first pilotable switch 58.1.

The presence of this electrical converter makes it possible to dissociate the issue of dimensioning of the capacitor (in particular in terms of voltage withstand and capacitance) so that it can fulfill on the one hand its role in the generation of the oscillating current allowing the extinction of the arc in the main switching apparatus, and on the other its role of power supply for the control grid 40.1 of the first plasma tube switch 34.1.

As can be seen in the figures, the distal armature C1d of the first changeover capacitor C1 is linked to an input terminal 78.1 of the DC-DC power converter 78, while the proximal armature C1p is linked to an electrical neutral 78.2 of the DC-DC power converter 78.

The command side of the power converter 78 includes a positive terminal 78.3 and a negative terminal 78.4. In the examples illustrated in FIGS. 2F, 2G, et 2H, the first pilotable switch 58.1 includes a first pilotable activation switch 58a interposed between the positive terminal 78.3 of the power converter 78 and the control grid 40.1 of the first plasma tube switch 34.1, and a second pilotable deactivation switch 58b interposed between the negative terminal 78.4 of the power converter 78 and the control grid 40.1 of the first plasma tube switch 34.1. The first pilotable activation switch 58a and the second pilotable deactivation switch 58b are switches which are normally open, and the control system 46.1 is configured so that only one at a time of the two pilotable switches 58a, 58b is controlled towards its closed state. When the first pilotable activation switch 58a is controlled towards its closed state, it authorizes the passage of a control current in the direction of the control grid 40.1 which causes the closing of the first plasma tube switch 34.1. When the second pilotable deactivation switch 58b is controlled towards its closed state, it authorizes the passage of a control current from the control grid 40.1, which causes the opening of the first plasma tube switch 34.1. As illustrated in th embodiment of FIG. 2G, it is also possible to provide a resistance 72 electrically in series with the first pilotable activation switch 58a interposed between the positive terminal 78.3 of the power converter 78 and the control grid 40.1, and/or a resistance 76 electrically in series with the second pilotable deactivation switch 58b interposed between the negative terminal 78.4 of the power converter 78 and the control grid 40.1 of the first plasma tube switch 34.1, to limit the current respectively during the closing and/or the opening of the first plasma tube switch 34.1.

In this second family of pilots 56.1, for the cases where the first plasma tube switch 34.1 includes a keep-alive electrode 44.1, then the pilot 56.1 can include a supply branching 62 linking the keep-alive electrode 44.1 of the first plasma tube switch 34 to the positive terminal 78.3 on the command side of the DC-DC power converter 78. Preferably, a resistance 64 is inserted into the branching 62 to limit the current in this supply branching 62. As illustrated in FIGS. 2G and 2H, a supply switch 68 can be inserted into the supply branch 62, the supply switch 68 having the same role and the same operation as the one described with reference to the embodiment of FIG. 2C.

In both cases, the device according to the invention makes it possible to perform these functions with a first changeover capacitor C1 having a voltage withstand which can be very much lower than the nominal operating voltage of the cut-off module 18, therefore very largely lower than the nominal operating voltage of the network into which the electrical conductor 11 is inserted. Indeed, the invention exploits the high voltage withstand of the plasma tube switch, generally about 10 times greater than that of an electronic switch, and the strong current cut-off ability of the plasma tube switch. Therefore, the cut-off module 18 includes, electrically in parallel with the first changeover capacitor C1, a first changeover surge protector 80.1. This first changeover surge protector 80.1 is therefore connected by its two terminals respectively to two points of the first section of the changeover branch, on either side of the first changeover capacitor C1.

The first changeover surge protector 80.1 limits the voltage at the terminals of the first changeover capacitor C1. Typically, in a cut-off device 10 intended for a very high voltage network, that is to say for a DC nominal operating voltage in the network greater than 75 kV, the voltage at the terminals of the first changeover capacitor C1 can thus be limited, by the first changeover surge protector 80.1, at a voltage less than or equal to 10 kV. Generally, it will be possible to provide that the first changeover surge protector 80.1 has a protection voltage less than 10% of the nominal operating voltage of the cut-off module. However, it is noted that the first changeover surge protector 80.1 will necessarily limit the pre-charge voltage that can be applied to the first changeover capacitor C1. Or this pre-charge voltage is used to control the plasma tube switch 34.1. Also, it will be made sure, except to provide for a voltage raising device in the control system 46.1 of the first plasma tube switch 34.1, that the protection voltage of the first changeover surge protector 80.1 is greater than the voltage necessary to the control of the plasma tube switch 34.1, the latter being generally greater than 1 kV, for example comprised between 1 kV and 5 kV. For example, a changeover surge protector 80.1 can be chosen such that its protection voltage is comprised between 1.5 and 2.5 times, for example 2 times the pre-charge voltage of the changeover capacitor C1 it must protect.

Thanks to this, the invention makes it possible to use a changeover capacitor C1 that does not have to withstand a voltage higher than the one defined by the protection voltage of the changeover surge protector 80.1. It is therefore possible to limit the cost and the space requirement of the first changeover capacitor C1.

As will be seen later, the generation of a changeover current oscillation in the changeover branch 32, when the first plasma tube switch 34.1 is in its closed state, results from a modulation of the current in the loop formed by the main branch 24 and the changeover branch 32 of the cut-off module 18. This loop, which in particular includes the first changeover capacitor C1, necessarily has a certain inductance so that the loop forms an LC circuit which generates a current ripple in the transient phases, current ripple which will utilized in the manner explained below to interrupt an electric arc likely to be formed in the main cut-off apparatus 26 in its open state.

The changeover inductance can result from the self-inductance of the components that make up the loop, in particular the self-inductance of the main branch 24 and/or the self-inductance of the changeover branch 32. However, if the self-inductance of the components is not sufficient, the loop formed by the main branch 24 and the changeover branch 32 can include a coil 82. This coil is preferably arranged in the changeover branch 32. In such a case, the coil 82 could be arranged in the second section 32.2 of the changeover branch 32. In the example of FIG. 1, the coil 82 is arranged in the first section 32.1 of the changeover branch, but not between the first changeover capacitor C1 and the first plasma tube switch 34.1, on the contrary between the first changeover capacitor C1 and the first point 20 of the main circuit 16. The changeover inductance will be dimensioned to limit the rate of change of current through the main cut-off apparatus 26, change which appears when the changeover branch 32 becomes conductive for the current by the closure of the plasma tube switch 34.1. The rate of change of current of the changeover branch 32 must be limited by the components in this branch to a value corresponding to the ability of the main cut-off apparatus 26 to interrupt the electric arc. The device is thus dimensioned so that it ensures the interruption of the arc in the main cut-off apparatus 26 when the current passing through this main electrical cut-off apparatus 26 passes through a zero value, even if the amplitude of the current flowing in the main circuit 16 is low or very low compared to the nominal operating intensity for which the main circuit is dimensioned. For example, in the case where the main cut-off apparatus 26 has the ability to interrupt the electric arc of a current with a high rate of change of intensity (di/dt), typically with an intensity gradient higher than or equal to 100 A per microsecond, then the changeover inductance and the pre-charge voltage of the changeover capacitor of the cut-off module will be dimensioned to limit the rate of change of current through the main cut-off apparatus 26, change which appears when the changeover branch 32 becomes conductive for the current by the closure of the plasma tube switch 34.1, at a value lower than 100 A per microsecond.

It will be noted that the use of changeover capacitors at a relatively low voltage, permitted by the invention which implements a plasma tube switch, is favorable. Indeed, under a relatively low voltage, changeover capacitors whose capacitance value will be relatively high will be used. Thus, the natural frequency of discharge of the changeover capacitor(s) in the changeover loop, which loop is therefore essentially of the LC type, will be comparatively low. For example, the cut-off module 18 could be dimensioned such that the natural frequency of discharge of the changeover capacitor(s) in the changeover loop is less than 3 kHz, preferably less than 1 kHz, more preferably less than 300 Hz.

For this, it will be ensured that the cut-off device includes a changeover inductance, for the loop constituted by the main branch and by the changeover branch, whose value is not lower than the ratio between on the one hand the difference between the pre-charge voltage of the changeover capacitor C1 and the voltage drop at the terminals of the plasma tube switch and on the other hand by the maximum value of the rate of change of intensity (di/dt_max) for which the main cut-off apparatus 26 is capable of interrupting the electric arc generated by a current of low intensity.

The general principle of operation of the cut-off module 18 as illustrated in FIG. 1 will be understood from the principle of operation which will be described in relation to the cut-off module 18 illustrated in FIG. 3. As indicated above, the cut-off module 18 as illustrated in FIG. 1 allows a current interruption in the electrical conductor 11 in the event that the fault current flows from the second point 22 to the first point 20 through the cut-off module 18, for example in the event of an electrical ground fault in the first segment 11.1 of the electrical conductor 11. More specifically, it is in this configuration that the cut-off assistance system, which is formed by the changeover branch 32 and by the energy absorption branch 28, will be available to help extinguish an electric arc likely to appear in the main cut-off apparatus 26 during its opening. The cut-off module as illustrated in FIG. 1 is therefore a one-way cut-off module relative to the direction of flow of the fault current, therefore for example a one-way cut-off module relative to the location of the fault.

For this, the invention also proposes a cut-off device including at least one two-way cut-off module 18 as illustrated in FIG. 3, which is configured to ensure a current interruption in the electrical conductor 11 regardless of the direction of flow of the fault current through the cut-off module 18, therefore for example both in the case where an electrical ground fault is located in the first segment 11.1 of the electrical conductor 11 and in the case where an electrical ground fault is located in the second segment 11.2 of the electrical conductor 11.

For this, the two-way cut-off module 18 of FIG. 3 includes all the elements described above in relation to FIG. 1, in the same arrangement, and with the same possibilities of variants. In addition to these elements, the cut-off module 18 comprises, in its changeover branch 32, a second plasma tube switch 34.2 which is interposed in the changeover branch 32 between the first point 20 and the second point 22 of the main circuit for this cut-off module 18, electrically in parallel with the first plasma tube switch 34.1, but in the opposite direction to the first plasma tube switch 34.1 in the changeover branch 32.

The second plasma tube switch 34.2 also includes an anode 36.2, a cathode 38.2 and a control grid 40.2. Due to the arrangement of the first plasma tube switch in the opposite direction, the cathode 38.2 of the second plasma tube switch 34.2 is linked to the second section 32.2 of the changeover branch 32 and the anode 36.2 of the second plasma tube switch 34.2 is linked to the first section 32.1 of the changeover branch 32.

It is noted that the second plasma tube switch 34.2 is arranged in the changeover branch 32 so as to be interposed between the first changeover capacitor C1 and the second point 22 of the cut-off module 18. In this way, the proximal armature C1p of the first changeover capacitor C1 is linked to the anode 36.2 of the second plasma tube switch 34.2.

Symmetrically relative to the first plasma tube switch 34.1, the cut-off module 18 includes a control system 46.2 of the second plasma tube switch 34.2 which includes, in series with the second plasma tube switch 34.2 in the changeover branch 32, between the first point 20 and the second point 22, a second changeover capacitor C2 which is arranged in the second section 32.2 of the changeover branch 32, which section is therefore the one linked to the cathode 38.2 of the second plasma tube switch 34.2. The second changeover capacitor C2 also includes a proximal armature C2p which is linked to the cathode 34.2 of the second plasma tube switch 34.2, and a distal armature C2d which is on the opposite side to the cathode 38.2 of the second plasma tube switch 34.2 compared to the proximal armature C2p. The distal armature C2d of the second changeover capacitor C2 is therefore linked to the second point 22 of the cut-off module 18.

It is noted that the second changeover capacitor C2 is arranged in the changeover branch 32 so as to be interposed between the first plasma tube switch 34.1 and the second point 22 of the cut-off module 18. In this way, the proximal armature C2p of the second changeover capacitor C2 is linked to the anode 36.1 of the first plasma tube switch 34.1.

In the example, the cut-off module 18 is a two-way module in which the two plasma tube switches are, apart from their reverse mounting, identical from the point of view of their electrical characteristics. Similarly, in the example, the second changeover capacitor C2 has the same electrical characteristics (voltage withstand, capacitance, etc.) as the first changeover capacitor C1. This identical dimensioning makes it possible to manage fault currents of the same amplitude and of the same dynamic whatever their direction of flow through the cut-off device 10. However, in some cases, for which it is possible to anticipate risks of electrical fault of different nature on one side and the other of the the cut-off device 10, a different dimensioning could be envisaged for the two plasma tube switches and/or for the second changeover capacitor C2 relative to the first changeover capacitor C1.

The cut-off device 10 includes a pre-charge circuit 48.2 of the second changeover capacitor C2. The pre-charge circuit 48.2 of the second changeover capacitor C2 can be distinct and independent from the pre-charge circuit 48.1 of the first changeover capacitor C1, as illustrated in FIG. 3. The pre-charge circuit 48.2 of the second changeover capacitor C2 can be an identical copy of the pre-charge circuit 48.1 of the second changeover capacitor C1.

Symmetrically to what was seen above for the first plasma tube switch 34.1, the control system 46.2 of the second plasma tube switch 34.2 includes at least a second pilotable switch which, in a closed state, supplies the control grid 40.2 of the second plasma tube switch 34.2 with a voltage derived from an electric voltage between the armatures C2p, C2f of the second changeover capacitor C2. The control system 46.2 of the second plasma tube switch 34.2 can take the same forms as those described above for the control system 46.1 of the first plasma tube switch 34.1.

Thus, the control system 46.2 of the second plasma tube switch 34.2 can be designed in the same way as described above with reference to FIGS. 2A to 2E, so that the second pilotable switch, in its closed state, links the control grid 40.2 of the second plasma tube switch 34.2 to the distal armature C2d of the second changeover capacitor C2. Similarly, the control system 46.2 of the second plasma tube switch 34.2 may also include a supply branching which supplies a keep-alive electrode 44.2 of the second plasma tube switch 34.2, if the latter comprises one. Alternatively, the control system 46.2 of the second plasma tube switch 34.2 may include, analogously to what has been described for FIGS. 2F, 2G and 2H, a DC-DC power converter having a source side which is linked to the distal armature C2d of the second changeover capacitor C2, and having a command side which supplies the control grid 40.2 of the second plasma tube switch 34.2 through the second pilotable switch. In this case, if the second plasma tube switch 34.2 includes a keep-alive electrode 44.2, the control system 46.2 may include a supply branching which links the keep-alive electrode 44.2 of the second plasma tube switch to a positive terminal on the command side of the second DC-DC power converter.

Just as for the first changeover capacitor C1, the cut-off device 10 is designed to be able to use a second changeover capacitor C2 having a voltage withstand which can be very much lower than the nominal operating voltage of the network into which the electrical conductor 11 is inserted. Therefore, the cut-off module 18 includes, electrically in parallel with the second changeover capacitor C2, a second changeover surge protector 80.2. This second changeover surge protector 80.2 is therefore connected by its two terminals respectively to two points of the second section 32.2 of the changeover branch 32, on either side of the second changeover capacitor C2. The second cut-off surge protector 80.2 makes it possible to limit the voltage at the terminals of the second changeover capacitor C2 while the fault current is flowing in the changeover branch. Typically, in a cut-off device 10 intended for a very high voltage network, that is to say for a DC nominal operating voltage in the network greater than 75 kV, the voltage at the terminals of the second changeover capacitor C2 can thus be limited, by the second changeover surge protector 80.2, to a voltage less than or equal to 10 kV. Typically, the second changeover surge proector 80.2 could be dimensioned with a protection voltage such that the sum of the protection voltages of the first changeover surge protector 80.1 and the second changeover surge protector 80.2 is lower than the nominal operating voltage of the cut-off module 18.

It is therefore understood that the two-way cut-off module illustrated in FIG. 3 makes it possible to authorize the passage of current in the changeover branch 32 according to the two directions of flow. To authorize the passage of current in the changeover branch 32 according to a direction of flow, namely from the second point 22 to the first point, it is possible to control the first plasma tube switch 34.1 in its closed state. To authorize the passage of current in the changeover branch 32 according to the other direction of flow, namely from the first point 20 to the second point 22, it is possible to control the second plasma tube switch 34.2 in its closed state.

Two current cut-off scenarios likely to be carried out by the cut-off device 10 of FIG. 3 will now be described.

A first current cut-off scenario is described in relation to FIGS. 4A to 4H which represent timing diagrams of change of different electrical quantities in the the cut-off device 10 of FIG. 3. A second current cut-off scenario is described in relation to the timing diagrams of FIGS. 5A to 5H. For the establishment of these timing diagrams, the convention that an electric current flowing from the first point 20 to the second point 22 through the cut-off device 10 (therefore from left to right in FIG. 3) is a positive direction electric current, has been arbitrarily considered.

In the two scenarios that will be described, the case of an initial current, called operational current, flowing in the negative direction with the used convention, that is to say in the direction going from the second point 22 to the first point 20, will be considered. However, the direction of the initial current, that is to say of the operational current, is not important and in both scenarios, it could therefore be in the opposite direction.

Figure 4:
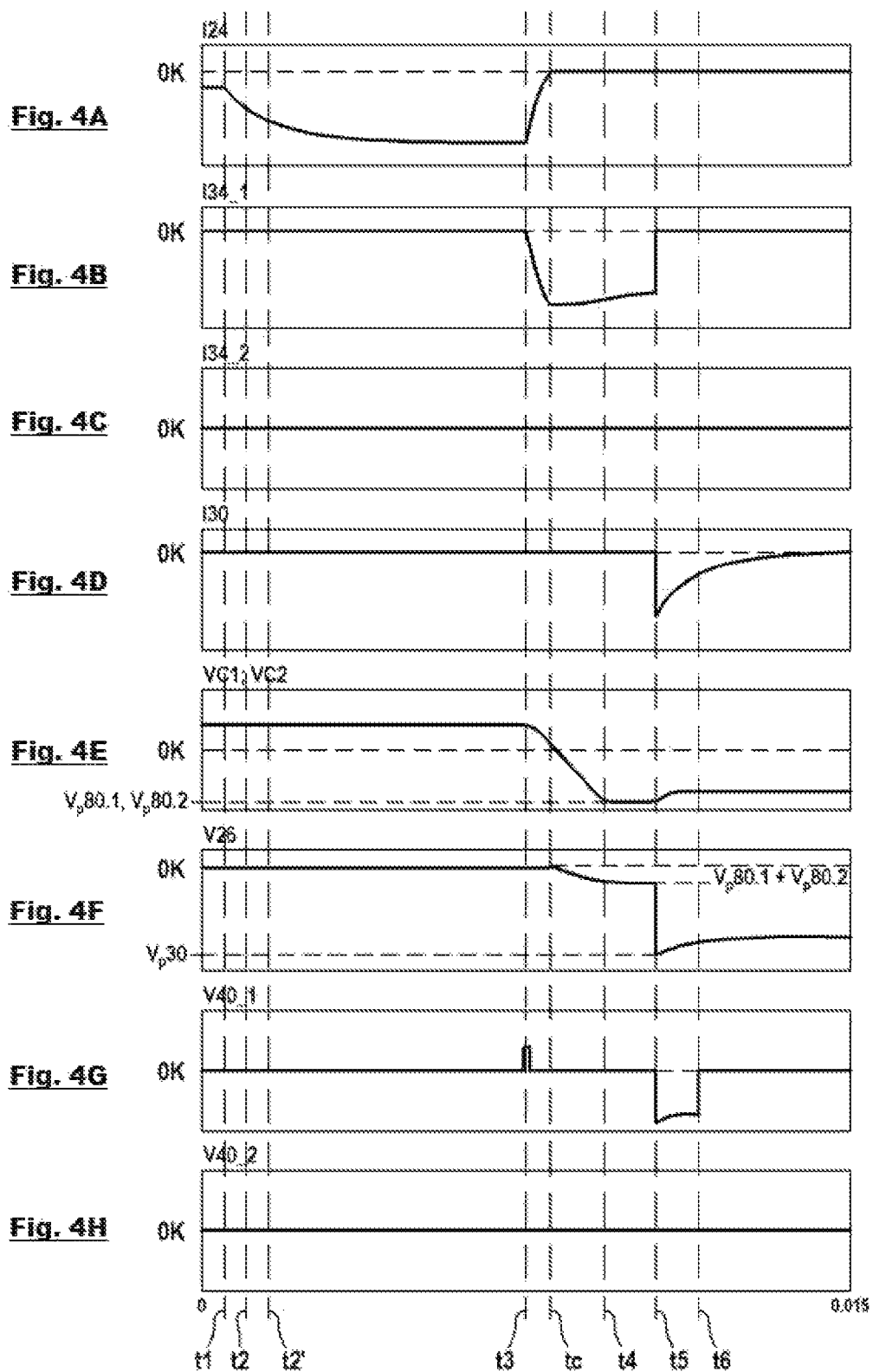
FIGS. 4A to 4H are diagrams illustrating the changes of different physical quantities in a cut-off device according to FIG. 3, for a first scenario of electrical cut-off by the cut-off device.

In both scenarios, until an instant t1, it is considered that the cut-off device 10 is in its conduction configuration, corresponding to a normal operation of the network, with therefore an operational electric current flowing in the electrical conductor 11. In the example, the absolute value of the intensity of the operational current is of the order of 1,500 A (here in the negative direction with the chosen arbitrary convention). In this conduction configuration, the main cut-off apparatus 26 is in its closed state, so that it can be considered that the entire operational electric current flows in the main branch 24 of the cut-off device 10 (FIG. 4A), and that the voltage V26 at the terminals of the main cut-off apparatus 26 is zero (FIG. 4F). In this conduction configuration, the two plasma tube switches 34.1 and 34.2 are in their open state, so that the electric currents 134.1 and 134.2 through each of them are zero (FIGS. 4B and 4C), and therefore so that the current in the changeover branch 32 is zero. It is noted that the control voltage V40.1 (FIG. 4G) applied to the control grid 40.1 of the first plasma tube switch 34.1 and the control voltage V40.2 (FIG. 4H) applied to the control grid 40.2 of the second plasma tube switch 34.2 are both equal to a fault voltage which in this example is a zero voltage. It will however be noted that some plasma tube switches operate by applying by default a fault voltage to the control grid which is negative relative to the cathode. Such plasma tube switches operating with a negative fault voltage at the control grid will be advantageously implemented with a pilot 56.1 including a DC-DC power converter, for example as in the examples of FIGS. 2F to 2H.

For both scenarios, the case is described in which the first changeover capacitor C1 is pre-charged with a voltage VC1 (FIG. 4E) at the terminals of the first changeover capacitor C1 which is here a positive voltage in the sense that the distal armature C1d is positively charged relative to the proximal armature C1p. In other words, the voltage VC1=VC1–VC1p is positive, with VC1d the electric potential of the distal armature C1d, and VC1p the electric potential of the proximal armature C1p. The absolute value of the pre-charge voltage VC1i at the terminals of the first changeover capacitor C1 can be advantageously less than 10 kV, here for example equal to 2 kV. However, it will be understood that it is possible to pre-charge the first changeover capacitor C1 with reverse polarity that is to say with a distal armature C1d negatively charged relative to the proximal armature C1p.

In the case of a two-way the cut-off device as illustrated in FIG. 3, the second changeover capacitor C2 will always be pre-charged, with the same voltage polarity as that of the first changeover capacitor C1. This means that if for the first changeover capacitor C1, the distal armature C1d is positively charged relative to the proximal armature C1p, then for the second changeover capacitor C2, the distal armature C2d is negatively charged relative to the proximal armature C2p so that the voltage VC2 at the terminals of the second changeover capacitor C2, voltage which is defined by VC2=VC2p–VC2d, with VC2d the electric potential of the distal armature C2d, and VC2p the electric potential of the proximal armature C2p, is a positive voltage.

At an instant t1, it is assumed that an electrical fault occurs in the first segment 11.1 of the electrical conductor 11, for example a fault of the type "ground fault". In this first scenario which is described here, the location and the type of electrical fault cause it to generate a fault current which flows in the negative direction through the cut-off device 10, that is to say from the second point 22 to the first point 20. It is immediately observed that the absolute value of the intensity through the device increases due to the appearance of this electrical fault, therefore increasing the absolute value of the intensity 124 (FIG. 4A) of the electric current in the main branch 24, this absolute value following an increase curve which depends on the electrical characteristics of the network, of the electrical conductor 11, and of the very characteristics of the electrical fault, in particular its location in the first segment 11.1 of the electrical conductor 11 and the fault resistance.

At an instant t2, an order to open the main cut-off apparatus 26 is transmitted. The instant t2 is separated from the instant t1 of appearance of the fault by a fault detection delay which is preferably comprised between 100 µs and 5 ms, for example approximately 1 ms. Preferably, in the case where the first plasma tube switch 34.1 also includes a keep-alive electrode 44.1, it will be chosen to supply the keep-alive electrode from this instant t2. This makes it possible to establish a plasma between the keep-alive electrode 44.1 and the cathode 34.1 so that the first plasma tube switch 34.1 is ready to allow the conduction of current, this even before the receipt of the electrical closing order of the first plasma tube switch 34.1.

Following receipt of the opening order, the main opening apparatus begins an opening movement. In a known manner, this opening is done by spacing of two electrodes of the main cut-off apparatus 26, which opening is done gradually in the form of a gradual spacing of the two electrodes. The instant of first separation of the electrodes from the main cut-off apparatus 26 is called t2'. Typically, this instant t2' is separated from the instant t2 of transmission of the opening order by a time of the order of 0.3 to 30 ms. In view of the voltage and of the intensity at the terminals of the main cut-off apparatus 26, an electric arc is formed between the electrodes of the main cut-off apparatus 26 at the instant t2' of their separation, this electric arc generates a large amount of energy and rapidly increases the temperature and causes ionization of the dielectric medium comprised between the two electrodes of the main cut-off apparatus chamber 26, so that, despite the mechanical separation of the electrodes, the electrical cut-off is not carried out. Consequently, the voltage V26 at the terminals of the main cut-off apparatus 26 remains zero (by neglecting the arc voltage) and the intensity 124 of the electric current in the main branch continues to increase in absolute value according to the same characteristic curve (cf. FIGS. 4A and 4F).

At an instant t3, the procedure for assisting the cut-off of the electric current begins in the main cut-off apparatus 26 which is then in an at least partially open state. Preferably, the instant t3 corresponds to a state of partial opening of the main the cut-off apparatus 26, therefore to a minimum spacing distance between the electrodes of the main the cut-off apparatus 26, for which it will have been previously predetermined that, once the electric arc has been extinguished between the electrodes, the main cut-off apparatus 26 is capable of withstanding the protection voltage generated by the changeover surge protector(s) 80.1, 80.2 present in the changeover branch 32. The time interval between the instant t2' and the instant t3, which can be called partial mechanical opening time interval, therefore depends in particular on the rate of spacing of the electrodes of the main cut-off apparatus 26 and on the level of the protection voltage of the changeover surge protectors 80.1, 80.2. During the partial mechanical opening time interval, the electrical cut-off is not performed. The partial mechanical opening time interval therefore depends on the protection voltage of the changeover surge protectors 80.1, 80.2, but we have seen that the invention makes it possible to implement changeover surge protectors 80.1, 80.2 whose protection voltage is very low compared to the nominal operating voltage of the cut-off module. In this way, for protection voltages of the changeover surge protectors 80.1, 80.2 less than 10 kV, it is possible to arrive at a duration of the partial mechanical opening time interval which may be less than 50 microseconds, or even less than 20 microseconds. This is very advantageous since this will make it possible to reduce the total time during which an arc is likely to remain in the main cut-off apparatus 26. Indeed, the sooner the procedure for assisting the cut-off of the electric current in the main cut-off apparatus 26 can be started, the sooner it will be possible to arrive at the instant "tc" of extinction of the electric arc between the electrodes of the main cut-off apparatus 26 as described below. Thus, at each opening, very little electric arc energy will be generated between the electrodes of the main cut-off apparatus 26, and therefore very little erosion of the electrodes will be produced.

In this first scenario, the cut-off assistance procedure is triggered by the electrical closing of the first plasma tube switch 34.1. Indeed, the principle is to control the closing of the plasma tube switch which is capable of allowing the fault current to flow in the changeover branch 32. It can be seen in FIG. 4G that the control system 46.1 sends, at the instant t3, on the monitoring grid 40.1 of the first plasma tube switch 34.1, an electrical closure pulse in the form of a voltage pulse. It will be remembered that, in this scenario, the first changeover capacitor C1 has been previously charged such that its distal armature C1$d$ is positively charged relative to its proximal armature C1$p$ and therefore positively charged relative to the cathode 38.1 of the first plasma tube switch 34.1. Therefore, the electrical closure pulse can be constituted by the direct electrical conduction of the distal armature C1$d$ with the monitoring grid 40.1 of the first plasma tube switch 34.1 (case of the pilots of FIGS. 2A to 2E), or by closing of a switch 58$a$ linking it to the positive terminal of the DC-DC power converter (case of the pilots of FIGS. 2F to 2G). It will be understood from reading the description below concerning the second scenario what should be done in case the changeover capacitor desired to be activated would were polarized in the opposite direction at the moment of the pre-charge. It is then noted that, with the application of the electrical closure pulse, the electric current 124 in the main branch is canceled (FIG. 4A) to switch entirely into the changeover branch 32, through the first plasma tube switch 34.1 made conductive for the electric current (FIG. 4B). The changeover time of the current from the main branch to the changeover branch 32 is equal to a maximum of a quarter of the period of oscillation of the current in the loop formed by the main branch 24 and by the changeover branch 32, knowing that this oscillation can be assimilated to the discharge of the capacitors in an LC or RLC circuit.

Indeed, the closing of the first plasma tube switch 34.1 allows the electrical closing of the loop formed by the main branch 24 and by the changeover branch 32, which forms an oscillating LC circuit. It will be recalled that, at the moment of closing, the two changeover capacitors C1 and C2 are pre-charged. They are arranged in series in the changeover branch and have an equivalent capacitance Ceq, with $$Ceq=C1*C2/(C1+C2)$$

In this first scenario, the direction of the fault current in the main circuit and the direction of polarization of the two changeover capacitors are such that the current oscillation generated in the LC loop formed by the main branch 24 and by the changeover branch 32 causes a zero crossing of the current in the main branch 24 in the first quarter period of the oscillation generated by the LC loop. In the illustrated example, it is therefore considered that from the instant "tc" of the first zero crossing of the current in the main branch 24, the electric arc between the electrodes of the main the cut-off apparatus 26 is extinguished. At the instant "tc", the main cut-off apparatus 26 therefore reaches its electrically open state.

The duration of the time interval between the instants "t3" and "tc" will typically be of the order of a few tens of microseconds to a few hundred microseconds, for example 50 to 500 microseconds.

It is therefore noted that the duration of the electric arc through the electric cut-off apparatus 26 is a duration that extends to the maximum from the instant t2' of first separation of the electrodes from the main cut-off apparatus 26 until the instant "tc", and which is therefore particularly short. This makes it possible to reduce the erosion of the electrodes of the main electrical cut-off apparatus 26. This also makes it possible to reduce the heat generated by the arc. This is therefore favorable to the reliability of the main electrical cut-off apparatus 26 and makes it possible to reduce the cost thereof.

The rate of change of intensity (di/dt) during a zero crossing of the current in the main branch 24, permitted by the changeover branch comprising the plasma tube switch 34.1, will be best exploited with a main cut-off apparatus 26 having the ability to interrupt the electric arc of a current with a high rate of change of intensity (di/dt), typically with an intensity gradient greater than or equal to 100 A per microsecond. Thus, a main cut-off apparatus 26 of the "vacuum switch" type will be particularly suitable.

It is noted that, in this cut-off scenario, it is the first plasma tube switch 34.1 that is controlled towards its closed state, because it is that of the two plasma tube switches that allows the flow of the current along the direction corresponding to the direction of the fault current generated through the the cut-off device 10 by the electrical fault.

In a known manner, it is observed (FIG. 4B) that the first plasma switch 34.1 remains in its closed state allowing the passage of the electric current including beyond the disappearance of the electrical closure pulse on its control grid 40.1 (FIG. 4G).

The sum of the voltages that appear at the terminals of the first changeover capacitor C1 and of the second changeover capacitor C2 is applied to the terminals of the main cut-off apparatus 26 after the instant "tc" of the cut-off of the electric arc. The rate of change of the voltage V26 at the terminals of the main cut-off apparatus 26 (dv/dt) is from this moment limited by the ratio between the intensity of the current in the main circuit 16 and the total capacitance of the changeover branch, which can be assimilated here to Ceq=C1*C2/(C1+C2). Moreover, the voltage peak is limited by the sum of the protection voltage of the two changeover surge protectors 80.1, 80.2. These two electrical limits, relating respectively to the rate of change of the voltage V26 and to the voltage peak, define the dimensioning of the components so that the cut-off apparatus 26 maintains the absence of current and prevents the re-ignition of an electric arc between the electrodes of the main cut-off apparatus 26, which allows the deionization of the medium between the electrodes of the main cut-off apparatus 26 and therefore makes it possible to continue the movement of relative remoteness between the two electrodes.

The flow of the electric current in the changeover branch 32 causes a reversal of the polarization of the first changeover capacitor C1, since it is seen in FIG. 4E that the voltage VC1 at the terminals of the first changeover capacitor C1 passes from the initial positive value to a negative value reached very quickly at instant t4. The instant t4 corresponds reaching, at the terminals of the first changeover capacitor C1, a voltage equal to the protection voltage determined by the first changeover surge protector 80.1 which is connected by its two terminals respectively on either side of other of the first changeover capacitor C1. By becoming conductive, the first changeover surge protector 80.1 limits the voltage at the terminals of the first changeover capacitor C1 to a predetermined value equal to the protection voltage $Vp80.1$ of the first changeover surge protector 80.1. The protection voltage $Vp80.1$ is preferably less than 10 kV, in the example of the order of 3 kV in absolute value, in order to limit the cost and the volume of the first changeover capacitor C1. The same voltage switching and the installation of the same protection voltage can be observed ar the terminals of the second changeover capacitor.

At the next instant t5, it is considered that the main electrical cut-off apparatus 26 is able to withstand the protection voltage established by the general surge protector 30. For example, this implies that a sufficient distance has been reached between the electrodes the main electrical cut-off apparatus 26 and that the dielectric medium between the electrodes the main electrical cut-off apparatus 26 is deionized. The latter has therefore regained its power of electrical insulation in its open state. In this way, it is possible to interrupt the flow of current in the changeover branch 32 by causing the electrical opening of the first plasma tube switch 34.1. This is caused by the control system 46.1 which sends, at instant t5, an electrical opening pulse on the control grid 40.1 of the first plasma tube switch 34.1 (FIG. 4G). It is noted that, at this instant t5 at which the electrical opening of the first plasma tube switch 34.1 is controlled, the polarity of the first changeover capacitor C1 is such that the distal armature $C1d$ is at a negative electric potential (FIG. 4E) relative to the proximal armature $C1p$, and therefore also relative to the cathode 38.1, so that the electrical opening pulse applied to the control grid 40.1 can be obtained simply by placing in electrical conduction the distal armature $C1d$ of the first changeover capacitor C1 with the control grid 40.1 of the first plasma tube switch 40.1 (case of the pilots of FIGS. 2A to 2E), or by the closing of a deactivation switch 58b linking it to the negative terminal of the DC-DC power converter (case of the pilots of FIGS. 2F to 2G). In the example, the electrical opening pulse is applied for an electrical opening pulse time up to an instant t6 to guarantee the electrical cut-off within the first plasma tube switch 34.1. This electrical opening pulse time is for example at least equal to 1 microsecond. It is noted that the electrical opening pulse can be maintained until an electrical closure pulse is necessary. It is noted that, following such an electrical opening pulse, the duration during which a current actually flows through the control grid 40.1 will generally be comprised between 1 microsecond and 100 microseconds, and the intensity of this current actually through the control grid 40.1 is of the same order of magnitude as that of the current to be cut off between the anode 36.1 and the cathode 38.1 through the first plasma tube switch 34.1.

The time necessary for the electrical opening of a plasma tube switch is generally of the order of a few hundred nanoseconds to a few tens of microseconds. It is noted that the current interruption in the plasma tube switch will not generate re-ignition of the arc in the main cut-off apparatus 26, since the main cut-off apparatus 26 is already electrically open and the dielectric medium between the contacts is deionized. In addition, the current flowing through the plasma tube switch can switch to the absorption branch 28 which will absorb all the inductive energies of the transmission line, without creating arc ignition in the plasma tube switch because it is dimensuined to withstand a recovery voltage greater than the protection voltage of the general surge protector 30 interposed in the absorption branch 28.

When a plasma tube switch is controlled in an electrically closed state, authorizing the flow of an electric current between its anode and its cathode, it operates in a mode in which the ratio of the current density in relation to the cathode electrode area is much smaller than in arc generation mode. For example, this ratio is less than $100A/cm^2$. In a plasma tube switch of the "perpendicular field" type, in which a magnetic field is applied parallel to the conduction surface of one of the cathode electrodes of the plasma tube switch, the magnetic field prevents this generation of arc as long as it falls within in its nominal field of operation.

It should be in particular recalled that a plasma tube switch has a current interruption ability that not all electrical switches have.

From the instant for which the first plasma tube switch 34.1 has reached its open state, no more current flows in the changeover branch 32 (FIG. 4B). As a result, a high voltage appears at the terminals of the general surge protector 30 which is electrically in parallel with the main branch 24 and the changeover branch 32 in which no more current can flow. This voltage is imposed by the fault current. However, the general surge protector 30 comes into action by limiting the voltage at the terminals of the cut-off module 18 to the value of its protection voltage $Vp30$ (FIG. 4F). From there, there is observed in the electrical conductor 11 a drop in the absolute value of the intensity of the current which corresponds to the dissipation of the inductive and capacitive energy stored in the conductor, energy which is dissipated in the general surge protector 30. Quickly, the open configuration of the cut-off device 10 is reached in which it can be seen that no current flows either in the main branch 24, or in the changeover branch 32 or in the absorption branch 28 (by neglecting a possible leakage current through the general surge protector 30, this leakage current generally being less than 1 A), thus isolating therebetween the first segment 11.1 and the second segment 11.2 of the electrical conductor 11. It is then established on either side of the cut-off device the voltage of the network, which is, in the example, of the order of 80 kV.

It is noted that, in this first cut-off scenario, the second plasma tube switch 34.2 does not intervene and remains in its open configuration throughout the scenario. The control system 46.2 of the second plasma tube switch 34.2 remains of course inactive, except of course with regard to the second changeover capacitor C2 which is interposed in the second section 32.2 of the changeover branch and whose capacitance intervenes in the laws of evolution of the current in the changeover branch 32. This is due to the fact that a hypothesis of a fault that generates a fault current flowing in the opposite direction to the one that the second plasma tube switch 34.2 makes flow in its closed state was taken.

As it is noted that the second plasma tube switch 34.2 of FIG. 3 does not intervene in this first scenario, it is understood that the first embodiment of the invention illustrated in FIG. 1, comprising a single plasma tube switch 34.1 capable only of passing a negative direction current (with the arbitrary convention chosen above) would operate exactly as described above. However, in this case, it will be important to make sure that the first changeover capacitor C1 is well pre-charged with the polarity described above, that is to say with a distal armature C1$d$ positively charged relative to the proximal armature C1$p$.

In the second current cut-off scenario illustrated by FIGS. 5A to 5F, it is assumed that the cut-off module 18 has a symmetrical dimensioning as regards the dimensioning of the two plasma tube switches 34.1, 34.2 on the one hand, and as regards the first changeover capacitor C1 and the second changeover capacitor C2 on the other hand.

This second scenario will describe the case where the first changeover capacitor C1 and the second changeover capacitor C2 are both pre-charged with a voltage VC1$i$, VC2$i$ which is a positive voltage in the sense that:

for the first changeover capacitor C1, the distal armature C1$d$ is positively charged relatiive to the proximal armature C1$p$;

for the second changeover capacitor C2, the distal armature C2$d$ is negatively charged relatiive to the proximal armature C2$p$.

As will be understood, it could just as well have been provided that the first changeover capacitor C1 and the second changeover capacitor C2 are both pre-charged with a voltage VC1$i$, VC2$i$ which is a negative voltage in the sense that:

for the first changeover capacitor C1, the distal armature C1$d$ is negatively charged relative to the proximal armature C1$p$;

for the second changeover capacitor C2, the distal armature C2$d$ is positively charged relative to the proximal armature C2$p$.

In all cases, the absolute value of the pre-charge voltage VC1$i$ at the terminals of the first changeover capacitor C1 and of the pre-charge voltage VC2$i$ at the terminals of the first changeover capacitor C2 can advantageously be less than 10 kV, here by example equal to 2 kV.

At an instant t1, it is assumed that an electrical fault occurs. In this second scenario, unlike the first one, it is assumed that this electrical fault occurs in the second segment 11.2 of the electrical conductor 11, but remains for example a fault of the "ground fault" type. In this second scenario described here, the location and the type of electrical fault cause it to generate a fault current which flows in the positive direction through the cut-off device 10, that is to say from the first point 20 to the second point 22. As already observed in the first scenario, the absolute value of the intensity through the device increases due to the appearance of this electrical fault, thus increasing the absolute value of the intensity 124 (FIG. 5A) of the electric current in the main branch 24, this absolute value following an increase curve which depends on the electrical characteristics of the network, of the electrical conductor 11, and of the very characteristics of the electrical fault, in particular its location in the second segment 11.2 of the electrical conductor 11 and the fault resistance.

As for the first scenario, an order to open the main cut-off apparatus 26 is transmitted, at an instant t2, according to the same procedures as described above for the first scenario. Following receipt of the opening order, the main opening apparatus begins an opening movement. The instant of first separation of the electrodes of the main cut-off apparatus 26 is called t2'. Here too, the gradual spacing of the two electrodes of the main cut-off apparatus 26, allows the generation of an electric arc so that, despite the mechanical separation of the electrodes, the electrical cut-off is not achieved. Consequently, the voltage V26 at the terminals of the main cut-off apparatus 26 remains zero (by neglecting the arc voltage—see FIG. 5F) and the intensity 124 of the electric current in the main branch continues to increase in absolute value (and in algebraic value with the arbitrary convention above—FIG. 5A).

Figure 5:
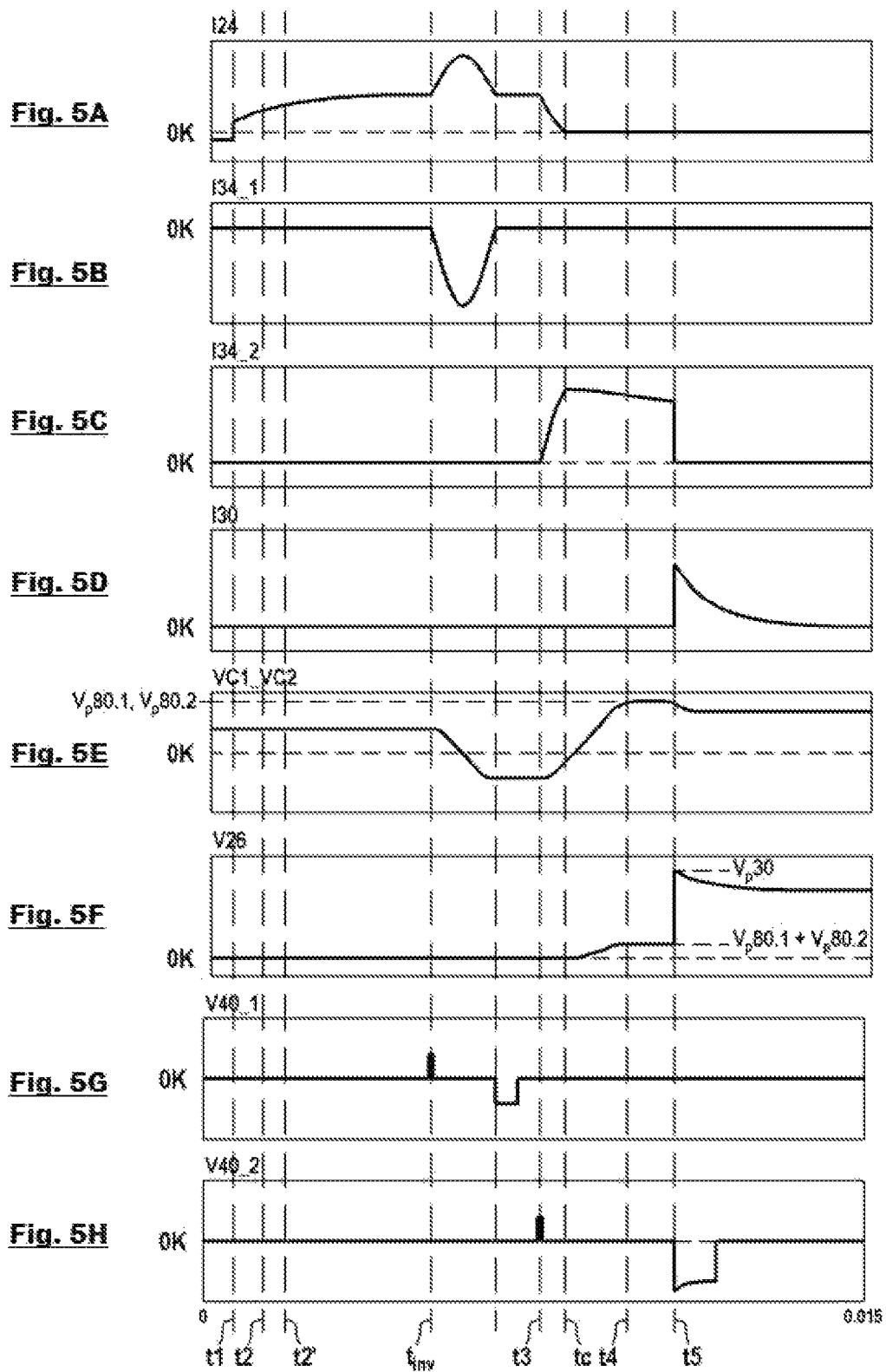
FIGS. 5A to 5H are diagrams illustrating the changes of various physical quantities in a cut-off device according to FIG. 3, for a second scenario of electrical cut-off by the cut-off device.

As for the first scenario, the procedure for assisting the cut-off of the electric current in the main cut-off apparatus 26 is triggered at an instant t3, when the latter is in an at least partially open state corresponding to a spacing of its electrodes for which it will have previously been predetermined that, once the electric arc has been extinguished between the electrodes, the main the cut-off apparatus 26 is capable of withstanding the protection voltage generated by the changeover surge protector(s) 80.1, 80.2 present in the changeover branch 32. During the partial mechanical opening time interval, the electrical cut-off is not performed (FIG. 5A).

It has already been indicated that in this second scenario, the cut-off assistance procedure implements the electrical closing of the second plasma tube switch 34.2, the only one capable of allowing the fault current to flow in the changeover branch 32. For this, it is therefore necessary that the control system 46.2 sends, at instant t3, to the monitoring grid 40.2 of the second plasma tube switch 34.2 an electrical closure pulse corresponding to a positive potential relative to the cathode. 38.2 of the second plasma tube switch 34.2. In addition, to allow the changeover of the fault current from the main branch to the changeover branch, with here therefore a flow of the fault current in the positive direction, the voltage at the terminals respectively of the first changeover capacitor C1 and of the second changeover capacitor C2 is a negative voltage.

However, this second scenario is defined in the context in which the first changeover capacitor C1 has been previously charged such that its distal armature C1$d$ is positively charged relative to its proximal armature C1$p$ and therefore positively charged relative to the cathode 38.1 of the first plasma tube switch 34.1, and that the second changeover capacitor C2 has been previously charged such that its distal armature C2$d$ is negatively charged relative to its proximal armature C2$p$ and therefore negatively charged relative to the cathode 38.2 of the second plasma tube switch 34.2. Indeed, this choice is quite plausible since it is assumed that the cut-off device 10 of FIG. 3 is intended to interrupt a current regardless of the direction of the fault current through the the cut-off device 10. However, the choice of the polarity of the pre-charge of the first changeover capacitor C1 and of the second changeover capacitor C2 is made before knowing the direction of the fault current likely to appear.

Therefore, in this configuration, the direction of flow of the fault current means that it could not be switched to the changeover branch with this direction of polarization of the changeover capacitors C1 and C2. In addition, for the embodiments of FIGS. 2A to 2F of the control system, the electrical closure pulse cannot be constituted by placing the distal armature C2$d$ in direct electrical communication with the monitoring grid 40.2 of the second plasma tube switch 34.2. Also, in this second scenario, at an instant "tinv" which is subsequent to the instant t2 of the transmission of an order to open the electrical cut-off apparatus 26, but which precedes the instant t3 for which a electrical closure pulse must be sent to the control grid 40.2 of the second plasma tube switch 34.2, this second scenario provides for an intermediate step of reverting the polarity of the first changeover capacitor C1 and of the second changeover capacitor C2.

The intermediate step of reverting the polarity of the changeover capacitors is carried out in a particularly simple way by first triggering, at the instant "tinv", the closing of the first plasma tube switch 34.1. As can be seen in FIGS. 5A and 5B, this closing of the first plasma tube switch 34.1 causes an overcurrent in the main branch 24 insofar as the two changeover capacitors C1 and C2 discharge by creating a negative direction discharge current in the changeover branch 32 (this negative direction current being imposed by the polarity of the charge of the two changeover capacitors C1 and C2), discharge current which is added in the positive direction in the main branch 24, in excess of the fault current. However, this discharge current is very brief. Indeed, this discharge takes place in a loop formed by the changeover branch 32 and the main branch 24 in series with each other, a loop which is an LC type loop which is dimensioned so that the discharge current is oscillatory. The discharge of the changeover capacitors C1 and C2 of the changeover branch 32 can only form a half oscillatory period, and not a complete oscillatory period since, at this stage, only the first plasma tube switch 34.1 has been made conductive and that it only allows the passage of the current in the changeover branch in only one direction. Thus, after a half period of oscillation, it is seen that the voltage at the terminals of the two changeover capacitors C1 and C2 has been inverted. As a result, then we are in a situation in which, for the second changeover capacitor C2, the distal armature C2$d$ is positively charged relative to the proximal armature C2$p$, and therefore relative to the cathode 38.2 of the second plasma tube switch 34.2. In this configuration, which results from the inversion of the polarities of the two changeover capacitors C1 and C2, it becomes possible on the one hand to create at instant t3 an electric closure pulse the second plasma tube switch 34.2, in the form of a voltage pulse, by placing the distal armature C2$d$ in direct electrical communication with the monitoring grid 40.2 of the second plasma tube switch 34.2, this including with the embodiments of FIGS. 2A to 2E of the control system 46.2. But, on the other hand, the other function of this inversion of the polarities of the two changeover capacitors C1 and C2 is to allow the flow in the changeover branch 32 of a changeover current in the positive direction through the second plasma tube switch 34.2, which at the same time leads to the cancellation of the current 124 in the main branch 24 from the instant "tc" (cf. FIG. 5A) which corresponds to the cut-off of the electric arc through the main electrical cut-off apparatus 26, at the moment when the intensity of the current passing through it crosses zero.

The flow of the electric current in the changeover branch 32 causes a new reversal of the polarization of the first changeover capacitor C1 and of the second changeover capacitor C2, since it is seen in FIG. 5E that the voltages VC1 at the terminals of the first changeover capacitor C1 and VC2 at the terminals of the second changeover capacitor C2 pass from the negative value resulting from the first inversion to a positive value. The instant t4 corresponds to the achievement, at the terminals of the first changeover capacitor C1, of a voltage equal to the protection voltage V$p$80.1 determined by the first changeover surge protector 80.1 which is connected by its two terminals respectively on either side of the first changeover capacitor C1 and, at the terminals of the second changeover capacitor C2, of a voltage V$p$80.2 equal to the protection voltage determined by the second changeover surge protector 80.2 which is connected by its two terminals respectively on either side of the second changeover capacitor C2. By becoming conductive, the first changeover surge protector 80.1 limits the voltage at the terminals of the first changeover capacitor C1 to a predetermined value equal to its protection voltage V$p$80.1. Similarly, by becoming conductive, the second changeover surge protector 80.2 limits the voltage at the terminals of the second changeover capacitor C2 to a predetermined value equal to its protection voltage V$p$80.2 (cf. FIG. 5E). The protection voltage V$p$80.2 is preferably, like the protection voltage V$p$80.1, less than 10 kV, in the example of the order of 3 kV in absolute value, this in order to limit the cost and the volume of the second changeover capacitorC2. The sum of the protection voltages V$p$80.1, V$p$80.2, respectively of the first changeover capacitor C1 of the second changeover capacitor C2, is preferably less than 20 kV, in the example of the order of 6 kV in absolute value.

At the next instant t5, it is considered that the dielectric medium comprised between the electrodes of the main the cut-off apparatus 26 has been deionized and that the gap between the electrodes is wide enough to hold the protection voltage established by the general surge protector 30 in the absorption branch, and that it is possible to interrupt the flow of current in the changeover branch 32 by causing the electrical opening of the second plasma tube switch 34.2 (the first plasma tube switch 34.1 has already been reopened previously after the step of inverting the polarity of the changeover capacitors). This is caused by the control system 46.2 which sends, at the instant t5, an electrical opening pulse to the control grid 40.2 of the second plasma tube switch 34.2. It is noted that, at this instant t5 at which the electrical opening of the second plasma tube switch 34.2 is controlled, the polarity of the second changeover capacitor C2 is such that the distal armature C2$d$ is at a negative electric potential relative to the proximal armature C2$p$, and therefore also relative to the cathode 38.2, so that the electrical opening pulse applied to the control grid 40.2 can be obtained simply by placing the distal armature C2$d$ of the second changeover capacitor C2 in electrical conduction with the control grid 40.2 of the second plasma tube switch 40.2 (case of the pilots of FIGS. 2A to 2E), or by the closing of a deactivation switch 58$b$ linking it to the negative terminal of the DC-DC power converter (case of the pilots of the FIG. 2F à 2G).

From the instant t5 for which the second plasma tube switch 34.2 has reached its open state, no more current flows in the changeover branch 32 (FIG. 5B, FIG. 5C). As a result, as in the first scenario, a high voltage appears at the terminals of the general surge protector 30 (FIG. 5F) which is electrically in parallel with the main branch 24 and with the changeover branch 32 in which no more current can flow. This voltage is imposed by the voltage of the network and the inductive energy stored in the network. However, the general surge protector 30 comes into action by limiting the voltage at the terminals of the cut-off module 18 to the value of its protection voltage V$p$30. From there, a drop in the absolute value of the intensity of the current which corresponds to the dissipation of the inductive and capacitive energy stored in the conductor 11 and in the device 10 is observed in the electrical conductor 11, which energy is dissipated in the general surge protector 30 (FIG. 5D). Quickly, the open configuration of the cut-off device 10 is reached in which it can be seen that no current flows either in the main branch 24, or in the changeover branch 32 or in the absorption branch 28 (by neglecting the leakage current of the by general surge protector 30, this leakage current being generally less than 1 A), thus isolating therebetween the first segment 11.1 and the second segment 11.2 of the electrical conductor 11. It is then established on either side of the cut-off device the voltage of the network, which is, in the example, of the order of 80 kV.

In the two scenarios described in detail above, the hypothesis of a first changeover capacitor C1 whose distal armature C1$d$ is positively charged relative to the proximal armature C1$p$, and of a second changeover capacitor C2 whose distal armature C2$d$ is on the contrary negatively charged relative to the proximal armature C2$p$, was taken. Reference was also made to the opposite hypothesis of a first changeover capacitor C1 whose distal armature C1$d$ would be negatively charged relative to the proximal armature C1$p$, and of a second changeover capacitor C2 whose distal armature C2$d$ would be on the contrary positively charged relative to the proximal armature C2$p$. In this opposite hypothesis, the appearance of a fault current of positive direction with the convention above would involve the implementation of a method similar to the one described for the first scenario, implementing only a single plasma tube switch, but in this case the second plasma tube switch 34.2, without polarity inversion of changeover capacitors C1 and C2. In this opposite hypothesis, the appearance of a fault current of negative direction with the convention above would involve the implementation of a method similar to the one described in the second scenario, by first implementing the second plasma tube switch 34.2 to create an inversion of polarities of the changeover capacitors C1 and C2, then implementing the first plasma tube switch 34.1 to authorize the passage of the changeover current in the negative direction in the changeover branch in order to assist the elecrical cut-off in the main cut-off apparatus 26.

In the example illustrated in FIGS. 1 and 3, the cut-off module 18 includes a single changeover branch 32 in which a single plasma tube switch 34.1 for the embodiment of FIG. 1, and two plasma tube switches 34.1, 34.2 mounted in parallel and in the opposite direction to each other for the embodiment of FIG. 3 are interposed. In both cases, it was seen that one among the plasma tube switch(es) is, in a cut-off assistance configuration of the main cut-off apparatus 26, made conductive to allow the fault current to flow in the changeover branch 32, then returned to an open state. Thus, in both cases, a plasma tube switch is traversed by a high current and must then interrupt a residual fault current which may also be high. It is however noted that the minimum time during which a plasma tube switch must be made conductive, which can also be called the minimum conduction time of the plasma tube switch, must cover the time of the changeover of the fault current from the main branch 26 containing the main cut-off apparatus 26 to the changeover branch 32, and must also cover the deionization time of the dielectric medium comprised between the electrodes of the main cut-off apparatus 26. However, it was seen that the time of the changeover of the fault current is less than a quarter of a period of the oscillating current generated by the changeover branch 32. This fault current changeover time is therefore smaller than the value given by the formula:

$$\frac{\pi}{2} * \sqrt{C_{equ} * L_{equ}}$$

with L_equ and C_equ respectively the equivalent inductance and the equivalent capacitance of the closed loop formed by the main branch 24 and by the changeover loop 32. The deionization time of the dielectric medium between the electrodes of the main cut-off apparatus 26 will be generally comprised in a range ranging from a few microseconds to a few tens of microseconds, in particular according to the technology of the main cut-off apparatus 26, in particular depending on the pressure and/or on the type of insulating fluid used. Thus, in total, the minimum conduction time of the plasma tube switch, that is to say the time during which the fault current passes therethrough, can be of very short duration since this duration could be generally less than 1 ms, preferably is less than 500 microseconds, and in some configurations this minimum duration may be less than 100 microseconds.

In the event that a single plasma tube switch is not capable of withstanding the maximum fault current intensity for which it is desired to dimension the cut-off device 10, it is easy to modify the cut-off module 18 by adding, in parallel with the changeover branch 32, and therefore in parallel with the main branch 24 and the absorption branch 28, at least one auxiliary changeover branch 32' including at least one plasma tube switch, the auxiliary changeover branch 32' preferably having the same configuration as the changeover branch 32 described with reference respectively to FIG. 1 and/or to FIG. 3.

FIG. 6 also represents a cut-off device 10 having a cut-off module 18 includig on the one hand exactly the same elements as those described in relation to the cut-off module 18 of FIG. 3, and, in addition, an auxiliary changeover branch 32', electrically in parallel with the main branch 24, with the absorption branch 28 and with the changeover branch 32 between the first point 20 and the second point 22. At least a first auxiliary plasma tube switch 34.1' is interposed in this auxiliary changeover branch 32' and includes an anode 36.1', a cathode 38.1', and a control grid 40.1'. The first auxiliary plasma tube switch 34.1' is interposed in the auxiliary changeover branch 32.1' so as to separate the auxiliary changeover branch 32' into a first section 32.1', linked to the cathode 38.1' of the first auxiliary plasma tube switch 34.1', and a second section 32.2', linked to the anode 36.1' of the first plasma tube auxiliary switch 34.1'.

The first auxiliary plasma tube switch 34.1' is mounted in the auxiliary changeover branch 32' in the same direction as the first plasma tube switch 34.1 in the changeover branch 32. This results for example in the fact that the anode 36.1' of the first auxiliary plasma tube switch 34.1' is linked (here each indirectly via a respective capacitor C1; C1') to the same point, among the first point 20 and the second point 22, as the anode 36.1 of the first plasma tube switch 34.1.

In general, it is understood that this first auxiliary plasma tube switch 34.1' could be controlled in an identical and synchronous manner with the first plasma tube switch 34.1 so that, in the cut-off assistance configuration, the current flowing through the device 10 is distributed, at the level of the considered module 18, between the two plasma tube switches, each plasma tube switch therefore having to transmit or interrupt a current lower than the total current passing through the the cut-off device 10. If the auxiliary changeover branch 32' has the same electrical characteristics as the changeover branch 32, the current in each of the changeover branches 32, 32' will be divided by 2 relative to the current that would flow in the changeover branch if the latter were unique.

Of course, it will be advantageously provided the cut-off module 18 includes a control system 46.1' of the first auxiliary plasma tube switch 34.1' similar to the one described for the first plasma tube switch 34.1. Thus, this control system 46.1' will advantageously include, in series with the first auxiliary plasma tube switch 34.1', in the auxiliary changeover branch 32', between the first point 20 and the second point 22, a first auxiliary changeover capacitor C1' arranged in the first section 32.1' of the auxiliary changeover branch 32', that is to say in the section which is linked to the cathode 38.1' of the first auxiliary plasma tube switch 34.1'. This first auxiliary changeover capacitor C1' includes a proximal armature C1p' linked to the cathode 38.1' of the first auxiliary plasma tube switch 34.1', and a distal armature C1d' opposite to the cathode 38.1' of the first auxiliary plasma tube switch 34.1' relative to the proximal armature C1p'.

Similarly, the cut-off device 10 includes a pre-charge circuit 48.1' of the first auxiliary changeover capacitor C1'. This pre-charge circuit could be a pre-charge circuit independent of that of the first changeover capacitor C1, and therefore take a form similar to the one described above. However, in the example of FIG. 6, the pre-charge circuit of the first changeover capacitor and the pre-charge circuit of the first auxiliary changeover capacitor include a common voltage source 50.1 which supplies in parallel the first changeover capacitor C1 and the first auxiliary changeover capacitor C1'. Thus, the common DC voltage source 50.1 includes:

on the one hand a positive terminal 52.1 which is linked, in this embodiment
to the distal armature C1d of the first changeover capacitor C1, here through a resistance 53.1, and
to the distal armature C1d' of the first auxiliary changeover capacitor C1', here through a resistance 53.1';
and on the other hand a negative terminal 54.1 which is linked, in this embodiment,
to the proximal armature C1p of the first changeover capacitor C1, here also through a resistance 55.1, and
to the proximal armature C1p' of the first auxiliary changeover capacitor C1', here also through a resistance 55.1'.

It was seen that, in a two-way device, it is possible to have an inverse polarity for the DC voltage source 50.1 since it is known to invert the pre-charge polarity of the changeover capacitors. Preferably, the resistances 53.1, 55.1, 53.1', 55.1' of the pre-charge circuit 48.1 have the same resistance value. These resistances make it possible to limit the current in the pre-charge circuit and balance the currents in the different parallel branching of the pre-charge circuit.

Of course, insofar as the cut-off module 18 illustrated in FIG. 6 includes a changeover branch 32 having two plasma tube switches electrically in parallel and in the opposite direction, it will be preferably provided that this cut-off module 18 includes, in the auxiliary changeover branch 32', two auxiliary plasma tube switches 34.1', 34.2' interposed in parallel and in the opposite direction to each other in the auxiliary changeover branch 32'. In other words, as illustrated in FIG. 6, the auxiliary changeover branch 32' preferably has exactly the same elements as the changeover branch 32.

The embodiment of FIG. 6 includes a single auxiliary changeover branch 32'. However, it is understood that, to further increase the ability of the cut-off module 18 to support currents of higher intensity, it could be provided to equip the cut-off module with one or more other auxiliary changeover branches, of the same type as the auxiliary changeover branch 32' which has just been described, each other auxiliary changeover branch being arranged electrically in parallel with the main branch 24, the absorption branch 28, the changeover branch 32 and the auxiliary changeover branch 32' between the first point 20 and the second point 22.

In the examples illustrated and described above, the cut-off device 10 includes a single cut-off module 18. It is therefore understood that the cut-off module 18, when it is single, must be designed to withstand the nominal operating voltage of the network. This involves in particular constraints on the voltage withstand of the plasma tube switch(es) 34.1, 34.2. It should moreover be noted that the voltage withstand of the plasma tube switch(es) 34.1, 34.2 could be easily of the same order of magnitude as that of the main the cut-off apparatus 26 of the module 18. This is all the more true if the main cut-off apparatus 26 is of the "vacuum bulb" type since, in this case, a plasma tube switch and a "vacuum bulb" are based on the same vacuum tube technology.

Figure 7:
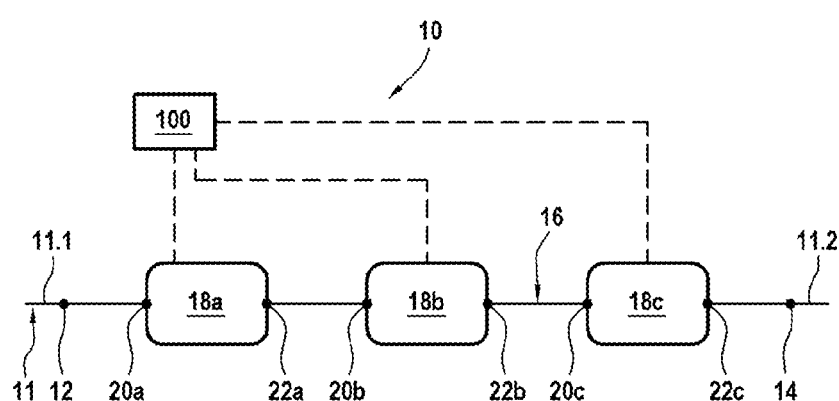
FIG. 7 is a schematic view of one exemplary embodiment of a cut-off device according to the invention, having several cut-off modules arranged in series in a main circuit.

However, to obtain the cut-off devices 10 with even higher opening and voltage withstand abilities, or to use components (in particular plasma tube switches) of reasonable cost and space requirement, it is possible to choose to make a cut-off device 10, such as the one illustrated for example in FIG. 7, having several cut-off modules 18a, 18b, 18c, . . . , electrically interposed in series in the main circuit 16 of the cut-off device 10, between the primary point 12 and the secondary point 14 of this cut-off device 10. Thus, each cut-off module 18a, 18b, 18c, . . . extends, in the main circuit 16, between its own first point 20a, 20b, 20c, . . . , and its own second point 22a, 22b, 22c, . . . . Each cut-off module 18a, 18b, 18c, etc., can have either of the forms described above, including the forms envisaged above comprising at least one auxiliary changeover branch 32' in parallel with a changeover branch 32. The cut-off modules 18a, 18b, 18c, etc., can be identical to each other.

In all the examples above, it was seen that the supply and control of the plasma tube switch(es) placed in the changeover branch(es) 32, 32' is carried out with a control system 46.1, 46.1', 46.2, 46.2' which imposes no electrical or electronic component in the main branch 24 of the cut-off module 18. Therefore, in the conduction configuration, during which the electric current through the cut-off device 10 transits in this main branch 24, there is no component belonging to the control system(s) of the plasma tube switch(es) which risks permanently dissipating electrical energy during the normal operation of the network. Thus, no cooling system is necessary to cool such components.

In all of the examples above, only the main cut-off apparatus 26, the plasma tube switch(es), and the general surge protector 30 must be dimensioned to withstand the high DC nominal operating voltage of the considered module 18, which can be typically greater than 75,000 V. On the contrary, the first changeover capacitor C1 and the second changeover capacitor C2, as well as the first changeover surge protector 80.1 and the changeover surge protector 80.2 can be dimensioned, for a cut-off module of a cut-off apparatus 10 dimensioned for such a network with a nominal operating voltage greater than 75,000 V, with a voltage withstand that may be less than 10,000 V, including in a cut-off apparatus 10 comprising a single cut-off module 18. These components, dimensioned for a voltage which can thus be of the order of 10 times lower than the nominal operating voltage of the network, can have a reduced space requirement and cost.

For a cut-off module 18, the dimensioning of a minimum capacitance of the changeover capacitor(s) can be determined as a first approximation according to the following equation:

$$V_{(c\_equ)} = [I_{to} * \sqrt{(L_{equ}/C_{equ})}] + V_{(on\_34)}$$

with $V_{(c\_equ)}$: the pre-charge voltage at the terminals of a capacitor equivalent to all the changeover capacitors in the changeover branch(es) (C1, C1', C2, C2', etc.) of the cut-off module 18, which will be in any case limited by the presence of the associated changeover surge protectors;

I_to: the maximum intensity of the current that the cut-off device 10 must be able to cut off;

L_equ: Equivalent inductance of the loop(s) formed by the main branch 24 and the changeover branch(es) 32 (82, 82', etc.) of the cut-off module 18;

C_equ: Minimum equivalent capacitance of all the changeover capacitors in the changeover branch(es) (C1, C1', C2, C2', etc.) of the cut-off module 18;

V_(on_34): The voltage drop between the anode and cathode of the plasma tube switch 34 in its conduction state (this voltage is generally comprised between 50 v and 1,000 v and depends on certain characteristics of the plasma tube switch, in particular the pressure and type of gas in the enclosure, the material of the cathode, etc. . . . ).

Furthermore, it was seen that each cut-off module 18 will be dimensioned so that the equivalent inductance value L_equ of the loop(s) formed by the main branch 24 and the changeover branch(es) 32 of the cut-off module 18 is greater than a minimum value L_min allowing the electric arc to be extinguished in the main cut-off apparatus 26 during the switching of the current to the changeover branch 32. Thus, this equivalent inductance value L_equ must be greater than a minimum value given by:

$$L\_min=(V\_(c\_equ)-V\_(on\_34))/[(di/dt)]max$$

with

[(di/dt)]max the maximum rate of change of current for which the main cut-off apparatus 26 is capable of cutting off the electric arc of a current during a zero crossing.

The equations above therefore make it possible to determine the minimum equivalent capacitance C_equ to be obtained, from which the individual capacitances of each of the changeover capacitors can be determined.

Typically, for a two-way device 10 as illustrated in FIG. 3, therefore comprising in this example a single cut-off module 18, it would for example possible to have for example, with the following values:

I_to=10 kA
VC1=VC2=2 kV (V_c_equ=4 kV)
L_equ=20 microHenrys
V_on_34=500V
(di/dt)max=200 A/μs the equivalent capacitance of all the changeover capacitors of the device 10 will be greater than 100 microfarads with thus for example C1=C2=400 microFarads (C_equ=200 μF).

Furthermore, it was seen above that the time during which a plasma tube switch 34.1, . . . , is made conductive is very short since this time is less than 1 ms. However, this time is also approximately the time during which a current is likely to pass through the changeover surge protector 80.1, . . . , which must then dissipate the corresponding electrical energy. Since the time is short, the volume and cost of such a changeover surge protector need not be overdimensioned.

In FIGS. 3 and 6, in which a changeover branch includes two plasma tube switches electrically arranged in parallel and in the opposite direction to each other, the two plasma tube switches can be designed as distinct one-way plasma tube switch components. However, it is possible to envisage designing these two one-way plasma tube switches in a twinned form.

It is noted that, as described above, the pilot 56.1, . . . , of the control system 46.1, . . . , of the plasma tube switch(es) in the changeover branch(es) does not require any autonomous power supply, since its supply is ensured through the associated changeover capacitor. It is also noted that, whatever the embodiments of the pilot 56.1, . . . , as illustrated in FIGS. 2A to 2H, the control system 46.1 of the plasma tube switch(es) is of low complexity since it can be designed with a single pilotable switch that needs to be piloted to control the associated plasma tube switch.

The device 10 according to the invention may include or be associated with one or more electronic control unit(s) 100 to control/pilot in particular the main electrical cut-off apparatus(es) 26 and the pilot(s) 56.1, . . . , of the control system 46.1, . . . , of the plasma tube switch(es) in the changeover branch(es). An electronic control unit typically comprises at least one processor and at least one electronic memory, and can comprise or be linked to one or more electronic communication circuits, for example communication with one or more computer networks, and/or one or more interface electronic circuits, and/or one or more input/output electronic circuits. An electronic control unit can comprise or be associated with one or more displays. An electronic control unit can comprise or be associated with one or more sensor(s), for example one or more intensity sensors and/or one or more voltage sensor(s), configured to measure a value of a physical parameter in the cut-off device 10 or in the electrical installation in which the device 10 is intended to be integrated. The electronic control unit(s) is/are programmed to implement all or part of a method for opening the device as described above. Advantageously, it will be possible de provide that the electronic control unit(s) 100 communicate(s) its/their control/piloting orders, in particular to the pilot(s) 56.1, . . . , of the control systems 46.1, . . . , by isolated signals galvanically relative to the high voltage. These signals could be optical signals carried by optical fibers. They may be electrical signals isolated by transformers. These signals may be electromagnetic signals transported by wireless communication links.

The electrical cut-off device 10 as described above therefore forms a current circuit breaker particularly suitable for currents under high DC voltage, in particular under high DC voltage greater than 75 kV. They make it possible to obtain sufficient cut-off performance with components which have, in total, a reduced space requirement and cost, with a minimum of energy losses in normal operation.

The invention claimed is:

1. A cut-off device for electric current under high DC voltage including:
 a main circuit, in which flows, in a conduction configuration of the cut-off device, an electric current under a high DC nominal operating voltage of the device;
 at least one cut-off module interposed in the main circuit between a first point and a second point of the main circuit, for the cut-off module, the cut-off module comprising:
 a main branch, between the first point and the second point of the cut-off module, with at least one main electrical cut-off apparatus, of mechanical type and interposed in the main branch between the first point and the second point,
 an absorption branch, electrically in parallel with the main branch between the first point and the second point of the cut-off module, with at least one general surge protector interposed in the absorption branch between the first point and the second point, a changeover branch, electrically in parallel with the main branch and the absorption branch between the first point and the second point of the cut-off module, with at least a first changeover capacitor arranged in the changeover branch, between the first point and the second point of the cut-off module, and a changeover switch capable of authorizing the flow of current in the changeover branch, a loop formed by the main branch and the changeover branch of the cut-off module, said loop of the cut-off module having a changeover inductance;

wherein:

the changeover switch includes at least a first plasma tube switch including an anode, a cathode and a control grid, the first plasma tube switch being interposed in the changeover branch between the first point and the second point of the cut-off module so as to separate the changeover branch into a first section, linked to the cathode of the first plasma tube switch and a second section, linked to the anode of the first plasma tube switch, the first changeover capacitor being arranged in the first section of the changeover branch which is linked to the cathode of the first plasma tube switch, a control system of the first plasma tube switch is electrically supplied by the first changeover capacitor, the first changeover capacitor includes a proximal armature linked to the cathode of the first plasma tube switch, and a distal armature opposite to the cathode of the first plasma tube switch relative to the proximal armature, the device includes a circuit for pre-charging the first changeover capacitor, the cut-off module includes a first changeover surge protector which has a protection voltage lower than a nominal operating voltage of the cut-off module and which is electrically connected in parallel with the first changeover capacitor, and in that the control system of the first plasma tube switch includes at least a first pilotable switch which, in a closed state, supplies the control grid of the first plasma tube switch by a voltage derived from an electrical voltage between the armatures of the first changeover capacitor.

2. The device apparatus and claim 1, wherein, during an opening of the cut-off device, the first pilotable switch is piloted according to a first closure pulse to control the closing of the first plasma tube switch after a partial mechanical opening of the main electrical cut-off apparatus, and is piloted according to a second closure pulse to control the opening of the first plasma tube switch after reversal of the charge polarity of the first changeover capacitor, defining a conduction time of the first plasma tube switch between the closing and the opening of the first plasma tube switch.

3. The device according to claim 1, wherein the first pilotable switch, in its closed state, electrically links the control grid of the first plasma tube switch to the distal armature of the first changeover capacitor.

4. The device according to claim 3, wherein the first pilotable switch is a two-way switch capable of conducting and blocking the current in both directions between the control grid of the first plasma tube switch and the distal armature of the first changeover capacitor.

5. The device according to claim 4, wherein the first pilotable switch is designed as two one-way electronic switches interposed in series and in the opposite direction to each other, between the control grid of the first plasma tube switch and the distal armature of the first changeover capacitor, each one-way electronic switch being equipped with a free wheel diode mounted in antiparallel with the one-way electronic switch.

6. The device according to claim 1, wherein the control system of the first plasma tube switch includes a supply branching which supplies a keep-alive electrode of the first plasma tube switch, the supply branching linking the keep-alive electrode of the first plasma tube switch to the distal armature of the first changeover capacitor.

7. The device according to claim 6, wherein the supply branching includes a supply switch capable of conducting and blocking the current in the supply branching, and a resistance interposed in the supply branching.

8. The device according to claim 7, wherein the supply switch is closingly piloted after receipt of a current interruption order by the cut-off device.

9. The device according to claim 1, wherein the control system of the first plasma tube switch includes a DC-DC power converter having a source side which is linked to the distal armature of the first changeover capacitor, and having a control side which supplies the control grid of the first plasma tube switch via the first pilotable switch.

10. The device according to claim 9, wherein the control side of the power converter includes a positive terminal and a negative terminal, and in that the first pilotable switch includes a first pilotable activation switch interposed between the positive terminal and the control grid of the first plasma tube switch, and a second pilotable deactivation switch interposed between the negative terminal and the control grid of the first plasma tube switch.

11. The device according to claim 10, wherein the control system of the first plasma tube switch includes a supply branching which supplies a keep-alive electrode of the first plasma tube switch, the supply branching linking a keep-alive electrode of the first plasma tube switch to the positive terminal on the control side of the DC-DC power converter.

12. The device according to claim 1, wherein the voltage at the terminals of the first changeover capacitor is limited, by the first changeover surge protector, to a protection voltage less than 10% of the nominal operating voltage of the cut-off module.

13. The device according to claim 1, wherein the first changeover capacitor has a capacitance greater than 100 microfarads.

14. The device according to claim 1, wherein the changeover inductance and the pre-charge voltage of the first changeover capacitor of the cut-off module are dimensioned to limit the rate of change of current through the main cut-off apparatus, change which appears when the changeover branch becomes conductive for the current by the closure of the plasma tube switch, at a value corresponding to the rate of change for which the main cut-off apparatus is capable of interrupting the electric arc.

15. The device according to claim 2, wherein, during an opening of the cut-off device, the conduction time of the first plasma tube switch is less than 1 millisecond.

16. The device according to claim 1, wherein:

the changeover switch comprises a second plasma tube switch including an anode, a cathode and a control grid, the second plasma tube switch being interposed in the changeover branch between the first point and the second point of the cut-off module, electrically in parallel with the first plasma tube switch, in the opposite direction to the first plasma tube switch, such that the cathode of the second plasma tube switch is linked to the second section of the changeover branch and such that the anode of the second plasma tube switch is linked to the first section of the changeover branch, a second changeover capacitor is arranged in the second section of the changeover branch which is linked to the cathode of the second plasma tube switch, a control system of the second plasma tube switch is electrically supplied by the second changeover capacitor, the second changeover capacitor includes a proximal armature linked to the cathode of the second plasma tube switch, and a distal armature opposite to the cathode of the second plasma tube switch relative to the proximal armature, the device includes a pre-charge circuit of the second changeover capacitor, the cut-off module includes a second changeover surge protector which has a protection voltage such that the sum of the protection voltages of the first changeover surge protector and of the second changeover surge protector is lower than the nominal operating voltage of the cut-off module and which is electrically connected in parallel with the second changeover capacitor, and in that the control system of the second plasma tube switch includes at least a second pilotable switch which, in a closed state, supplies the control grid of the second plasma tube switch by a voltage derived from an electric voltage between the armatures of the second changeover capacitor.

17. The device according to claim 1, wherein the at least one cut-off module includes at least one auxiliary changeover branch, electrically in parallel with the main branch, with the absorption branch and with the changeover branch between the first point and the second point of the cut-off module, with at least a first auxiliary plasma tube switch including an anode, a cathode and a control grid, the first auxiliary plasma tube switch being interposed in the auxiliary changeover branch between the first point and the second point of the cut-off module so as to separate the auxiliary changeover branch into a first section, linked to the cathode of the first auxiliary plasma tube switch, and a second section, linked to the anode of the first auxiliary plasma tube switch, and in that at least a first auxiliary changeover capacitor is arranged in the first section of the auxiliary changeover branch which is linked to the cathode of the first plasma tube switch.

18. The device according to claim 17, wherein:

the anode of the first auxiliary plasma tube switch is linked to the same point, among the first point and the second point of the cut-off module, as the anode of the first plasma tube switch of the at least one cut-off module;

in that the at least one cut-off module includes a control system of the first auxiliary plasma tube switch supplied by the first auxiliary changeover capacitor, the first auxiliary changeover capacitor includes a proximal armature linked to the cathode of the first auxiliary plasma tube switch, and a distal armature opposite to the cathode of the first auxiliary plasma tube switch relative to the proximal armature, the device includes a pre-charge circuit of the first auxiliary changeover capacitor, the device includes a first auxiliary changeover surge protector which has a protection voltage lower than a nominal operating voltage of the cut-off module, and which is electrically connected in parallel with the first auxiliary changeover capacitor, and in that the pre-charge circuit of the first changeover capacitor and the pre-charge circuit of the first auxiliary changeover capacitor include a common voltage source which supplies in parallel the first changeover capacitor and the first auxiliary changeover capacitor.

19. The device according to claim 17, wherein the at least one cut-off module includes, interposed in parallel and in the opposite direction to each other in the auxiliary changeover branch, two auxiliary plasma tube switches.

20. The device according to claim 1, wherein the device includes several cut-off modules interposed in series in the main circuit, each between a first point and a second point of the main circuit for the considered cut-off module.

* * * * *